United States Patent
Nassar et al.

(10) Patent No.: US 11,311,943 B2
(45) Date of Patent: Apr. 26, 2022

(54) MULTI-SPECTRAL METHOD FOR DETECTION OF ANOMALIES DURING POWDER BED FUSION ADDITIVE MANUFACTURING

(71) Applicant: The Penn State Research Foundation, University Park, PA (US)

(72) Inventors: Abdalla R. Nassar, State College, PA (US); Alexander J. Dunbar, Waltham, MA (US); Edward W. Reutzel, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 296 days.

(21) Appl. No.: 16/540,243

(22) Filed: Aug. 14, 2019

(65) Prior Publication Data
US 2020/0061710 A1    Feb. 27, 2020

Related U.S. Application Data

(60) Provisional application No. 62/723,156, filed on Aug. 27, 2018.

(51) Int. Cl.
*G01J 3/02*   (2006.01)
*B22F 10/20*   (2021.01)
(Continued)

(52) U.S. Cl.
CPC .............. *B22F 10/20* (2021.01); *B33Y 50/02* (2014.12); *G01J 3/0208* (2013.01); *G01J 3/443* (2013.01);
(Continued)

(58) Field of Classification Search
CPC ........ G01J 3/02; G01J 3/28; G01J 3/26; G01J 3/44; G01J 3/36
See application file for complete search history.

(56) References Cited

U.S. PATENT DOCUMENTS 5,606,588 A    2/1997   Umstadter et al.
6,008,896 A   12/1999   Sabsabi et al.
(Continued)

FOREIGN PATENT DOCUMENTS

WO   2015040433 A2   3/2015
WO   2017051168 A1   3/2017

*Primary Examiner* — Abdullahi Nur
(74) *Attorney, Agent, or Firm* — Buchanan Ingersoll & Rooney PC

(57) ABSTRACT

Embodiments of the systems can be configured to receive electromagnetic emissions of a substrate (e.g., a build material of a part being made via additive manufacturing) by a detector (e.g., a multi-spectral sensor) and generate a ratio of the electromagnetic emissions to perform spectral analysis with a reduced dependence on location and orientation of a surface of the substrate relative to the multi-spectral sensor. The additive manufacturing process can involve use of a laser to generate a laser beam for fusion of the build material into the part. The system can be configured to set the multi-spectral sensor off-axis with respect to the laser (e.g., an optical path of the multi-spectral sensor is at an angle that is different than the angle of incidence of the laser beam). This can allow the multi-spectral sensor to collect spectral data simultaneously as the laser is used to build the part.

16 Claims, 17 Drawing Sheets

(51) Int. Cl.
  *G01J 3/443* (2006.01)
  *B33Y 50/02* (2015.01)
  *B33Y 10/00* (2015.01)
  *G01J 3/12* (2006.01)
  *B22F 10/30* (2021.01)

(52) U.S. Cl.
  CPC ............... *B22F 10/30* (2021.01); *B33Y 10/00* (2014.12); *G01J 2003/1213* (2013.01)

(56) References Cited

U.S. PATENT DOCUMENTS

| | | |
|---|---|---|
| 6,122,564 A | 9/2000 | Koch et al. |
| 8,723,078 B2 | 5/2014 | Mazumder et al. |
| 11,179,807 B2 * | 11/2021 | Martinsen ............ B23K 26/342 |
| 2016/0184983 A1 | 6/2016 | McGougan |
| 2016/0185048 A1 | 6/2016 | Dave et al. |

* cited by examiner

Receiving electromagnetic emissions from a surface of a substrate

Splitting the electromagnetic emissions into a first light beam and a second light beam, the first light beam corresponding to line emissions of at least one component of the substrate, the second light beam corresponding to continuum emissions of the at least one component of the substrate Generating line data $S_{Line}$ representative of an intensity of the first light beam Generating continuum data $S_{Continuum}$ representative of an intensity of the second light beam Subtracting $S_{Continuum}$ from $S_{Line}$ to generate line-continuum difference data ($S_{Line} - S_{Continuum}$)

Dividing ($S_{Line} - S_{Continuum}$) by the $S_{Continuum}$ to generate continuum to line-to-continuum ratio data $S_{Line-to-Continuum}$ Using $S_{Line}$, $S_{Continuum}$, ($S_{Line} - S_{Continuum}$), and/or $S_{Line-to-Continuum}$ data to identify anomalies related to defects in the substrate Measure spectra data from each multi-spectral sensor 102 across the build area, wherein the total spectra data Sn is governed by
$S_n = G(x_1,y_1) Source_1 + G(x_1,y_1) Source_2 + ... + G(x_n,y_n) Source_n$.

Determine and correct for measurement differences and determine and correct for positional dependence by solving n equations of n unkowns If a plurality of multi-spectral sensors are used, repeat for each sensor across the build area

FIG. 16

MULTI-SPECTRAL METHOD FOR DETECTION OF ANOMALIES DURING POWDER BED FUSION ADDITIVE MANUFACTURING

CROSS-REFERENCE TO RELATED APPLICATIONS

This application is related to and claims the benefit of U.S. Provisional Application No. 62/723,156 filed on Aug. 27, 2018, the entire contents of which is incorporated herein by reference.

STATEMENT REGARDING FEDERALLY SPONSORED RESEARCH AND DEVELOPMENT

This invention was made with government support under Grant No. N00014-14-1-0659 awarded by the United States Navy/ONR. The Government has certain rights in the invention.

FIELD OF THE INVENTION

Embodiments of the systems can be configured to receive electromagnetic emissions of a substrate by a detector and generate a ratio of the electromagnetic emissions to perform spectral analysis with a reduced dependence on location and orientation of the substrate relative to the detector.

BACKGROUND OF THE INVENTION

Conventional systems and techniques for performing spectral analysis and assessing build quality of a part made during additive manufacturing are limited to material testing techniques performed after the build of a part. One of the reasons for this can be due to the inability of known systems to detect and analyze spectral data in a manner that is insensitive to or independent of the location and orientation of a surface of the build material relative to the detector. Being limited to post-build analyses can preclude the ability to make adjustments during the build and/or aborting the build. Known system and methods for assessing material characteristics of a part can be appreciated from U.S. Pat. Nos. 8,723,078, 6,122,564, 6,008,896, 5,606,588, U.S. Pat. Publ. No. 2016/0185048, U.S. Pat. Publ. No. 2016/0184893, International Publ. No. WO 2017/051168, and International Publ. No. WO 2015/040433.

SUMMARY OF THE INVENTION

Embodiments of the systems can be configured to receive electromagnetic emissions of a substrate by one or more detectors (e.g., a multi-spectral sensors) and generate ratios of the electromagnetic emissions or multiple calibrated measurements to perform spectral analysis with a reduced dependence on location and orientation of a surface of the substrate relative to the multi-spectral sensor. In one embodiment, system can be used to collect spectral data of a substrate that is build material of a part being made via additive manufacturing. The additive manufacturing process can involve use of a laser configured to generate a laser beam for sintering or fusion of the build material into the part. Embodiments of the system can be configured to set the multi-spectral sensor off-axis with respect to the laser (e.g., an optical path of the multi-spectral sensor is at an angle that is different than the angle of incidence of the laser beam). This can allow the multi-spectral sensor to collect spectral data simultaneously as the laser is used to build the part.

Embodiments of the system can be configured to utilize several multi-spectral sensors to simultaneously collect spectral data of a substrate that is build material of a part being made via additive manufacturing using multiple energy sources. Each energy source can be a laser beam used for sintering or fusion of the built material into the part. Embodiments of the system can be configured to set each multi-spectral sensor at a unique location, such that the field of view of one multi-spectral sensor overlaps one or more other fields of view of another multi-spectral sensor. This can allow each multi-spectral sensor to collect spectral data simultaneously as multiple lasers are used to build the part. Calibration and analysis of the spectral emittance can be used to perform deconvolution of the collected spectral data to determine the contribution of each energy source to the measured spectral emittance.

Embodiments of the system can be configured to facilitate determining build quality (e.g., lack of fusion and porosity) of the part in real time (e.g., in situ analysis) by assessing the spectral emittance during the build process. Analysis of the spectral emittance can be used to identify anomalies (e.g., defects) affecting build quality. This can provide the ability to adjust operating parameters of the additive manufacturing apparatus, accommodate for component irregularities, and/or abort the build. Some embodiments can involve a feedback loop to automatically adjust the operating parameters as the build is performed. Some embodiments can involve using the spectral analysis to guide post-build inspection. For example, embodiments can facilitate identifying potential flaw areas that will be the focus of post-build inspection.

In one embodiment, a multi-spectral sensor includes: a receiver configured to receive electromagnetic emissions from a surface of a substrate; a splitter configured to split the electromagnetic emissions into a first light beam and a second light beam, the first light beam corresponding to line emissions of at least one component of the substrate, the second light beam corresponding to continuum emissions of the at least one component of the substrate; a first filter configured to receive the first light beam and pass light having wavelengths within a 10 nm range about the line emissions of the at least one component of the substrate and block or attenuate light having wavelengths outside the 10 nm range about the line emissions of the at least one component of the substrate; a second filter configured to receive the second light beam and pass light having wavelengths within a 10 nm range about the continuum emissions of the at least one component of the substrate and block or attenuate light having wavelengths outside the 10 nm range about the continuum emissions of the at least one component of the substrate; a processor configured to: generate line data $S_{Line}$ representative of an intensity of the first light beam; generate continuum data $S_{Continuum}$ representative of an intensity of the second light beam; subtract $S_{Continuum}$ from $S_{Line}$ to generate line-continuum difference data $(S_{Line} - S_{Continuum})$; and divide $(S_{Line} - S_{Continuum})$ by the $S_{Continuum}$ to generate continuum to line-to-continuum ratio data $S_{Line-to-Continuum}$.

In some embodiments, the receiver is an optical receiver having an optical receiver axis; the optical axis forms an angle $\beta$ with respect to the surface of the substrate; the optical receiver is a distance d from the surface of the substrate; and $S_{Line-to-Continuum}$ is independent of d and/or $\beta$.

In some embodiments, the multi-spectral sensor further includes an optical receiver lens configured to receive the electromagnetic emissions and focus the electromagnetic emissions at an image plane; a corrector located at the image plane and configured to diffuse an angle of incidence of the electromagnetic emissions; and a collimating lens positioned at a distance approximately equal to its focal length from the image plane and configured to collimate electromagnetic emissions onto the splitter; and wherein the splitter is a beam splitter.

In some embodiments, the processor is an optical emission spectrometer.

In some embodiments, electromagnetic emissions include emissions related to a melt pool and a plume generated on the surface.

In some embodiments, the at least one component of the substrate comprises build material of the substrate and a contaminate.

In one embodiment, an additive manufacturing apparatus includes: an energy source configured to melt, sinter, or fuse build material to form a part by imparting energy on a surface of build material, wherein imparting energy on the surface generates a melt pool and a plume on the surface; a multi-spectral sensor, comprising: an optical receiver configured to receive electromagnetic emissions from at least the melt pool and the plume; a beam splitter configured to split the electromagnetic emissions into a first light beam and a second light beam, the first light beam corresponding to line emissions of at least one component of the build material, the second light beam corresponding to continuum emissions of the at least one component of the build material; a first filter configured to receive the first light beam and pass light having wavelengths within a 10 nm range about the line emissions of the at least one component of the build material and block or attenuate light having wavelengths outside the 10 nm range about the line emissions of the at least one component of the build material; a second filter configured to receive the second light beam and pass light having wavelengths within a 10 nm range about the continuum emissions of the at least one component of the build material and block or attenuate light having wavelengths outside the 10 nm range about the continuum emissions of the at least one component of the build material; a processor configured to: generate line data $S_{Line}$ representative of an intensity of the first light beam; generate continuum data $S_{Continuum}$ representative of an intensity of the second light beam; subtract $S_{Continuum}$ from $S_{Line}$ to generate line-continuum difference data $(S_{Line}-S_{Continuum})$; and divide $(S_{Line}-S_{Continuum})$ by the $S_{Continuum}$ to generate continuum to line-to-continuum ratio data $S_{Line-to-Continuum}$.

In some embodiments, the energy source is a laser.

In some embodiments, the laser is configured to generate a laser beam at an angle $\alpha$ relative to the surface of the build material; the optical receiver has an optical receiver axis and the optical axis forms an angle $\beta$ with respect to the surface of the build material; and $\alpha$ does not equal $\beta$.

In some embodiments, the processor is an optical emission spectrometer.

In some embodiments, the additive manufacturing apparatus further includes a monitoring unit configured to synchronize with the multi-spectral sensor.

In some embodiments, the synchronization comprises generating a compilation of $S_{Line}$, $S_{Continuum}$, $(S_{Line}-S_{Continuum})$, and/or $S_{Line-to-Continuum}$ data for at least one layer of the part.

In some embodiments, the multi-spectral sensor further includes: an optical receiver lens configured to receive the electromagnetic emissions and focus the electromagnetic emissions at an image plane; a corrector located at the image plane and be configured to diffuse an angle of incidence of the electromagnetic emissions; and a collimating lens positioned at a distance approximately equal to its focal length from the image plane and configured to collimate electromagnetic emissions onto the beam splitter.

In some embodiments, the monitoring unit is configured to monitor and control operating parameters of the additive manufacturing apparatus; the synchronization comprises generating a feedback loop so that $S_{Line}$, $S_{Continuum}$, $(S_{Line}-S_{Continuum})$, and/or $S_{Line-to-Continuum}$ data is used to identify anomalies related to defects in the part in real-time as the part is being built; and anomaly information is used to automatically control operating parameters of the additive manufacturing apparatus to accommodate or correct for the anomalies.

In one embodiment, a method of performing spectral analysis involves receiving electromagnetic emissions from a surface of a substrate; splitting the electromagnetic emissions into a first light beam and a second light beam, the first light beam corresponding to line emissions of at least one component of the substrate, the second light beam corresponding to continuum emissions of the at least one component of the substrate; generating line data $S_{Line}$ representative of an intensity of the first light beam; generating continuum data $S_{Continuum}$ representative of an intensity of the second light beam; subtracting $S_{Continuum}$ from $S_{Line}$ to generate line-continuum difference data $(S_{Line}-S_{Continuum})$; and dividing $(S_{Line}-S_{Continuum})$ by the $S_{Continuum}$ to generate continuum to line-to-continuum ratio data $S_{Line-to-Continuum}$; and using $S_{Line}$, $S_{Continuum}$, $(S_{Line}-S_{Continuum})$, and/or $S_{Line-to-Continuum}$ data to identify anomalies related to defects in the substrate.

In some embodiments, the substrate includes build material of a part made by an additive manufacturing apparatus.

In some embodiments, the method involves generating $S_{Line}$, $S_{Continuum}$, $(S_{Line}-S_{Continuum})$, and/or $S_{Line-to-Continuum}$ data in situ as the part is being generated.

In some embodiments, the method involves generate a laser beam at an angle $\alpha$ relative to the surface of the build material; receiving the electromagnetic emissions though an optical receiver having an optical receiver axis that forms angle $\beta$ with respect to the surface of the build material; and $\alpha$ does not equal $\beta$.

In some embodiments, the method involves generating a feedback loop so that anomaly information related to defects in the part is used to control operational parameters of the additive manufacturing apparatus.

In some embodiments, the method involves using anomaly information to guide post-build inspection techniques for the part.

In some embodiments, receiving electromagnetic emissions involves: receiving, by a first multi-spectral sensor, a first electromagnetic emission from a first position of the substrate, the first electromagnetic emission being generated from a first energy source; and receiving, by a second multi-spectral sensor, a second electromagnetic emission from a second position of the substrate, the second electromagnetic emission being generated from a second energy source.

In some embodiments, the method involves deconvolution of the electromagnetic emission.

Further features, aspects, objects, advantages, and possible applications of the present invention will become apparent from a study of the exemplary embodiments and examples described below, in combination with the Figures, and the appended claims.

BRIEF DESCRIPTION OF THE DRAWINGS

The above and other objects, aspects, features, advantages and possible applications of the present invention will be more apparent from the following more particular description thereof, presented in conjunction with the following drawings. Like reference numbers used in the drawings may identify like components.

FIG. 16. shows an exemplary procedure by which one or more multi-spectral sensors can be calibrated.

DETAILED DESCRIPTION OF THE INVENTION

The following description is of exemplary embodiments that are presently contemplated for carrying out the present invention. This description is not to be taken in a limiting sense, but is made merely for the purpose of describing the general principles and features of the present invention. The scope of the present invention is not limited by this description.

Figure 1:
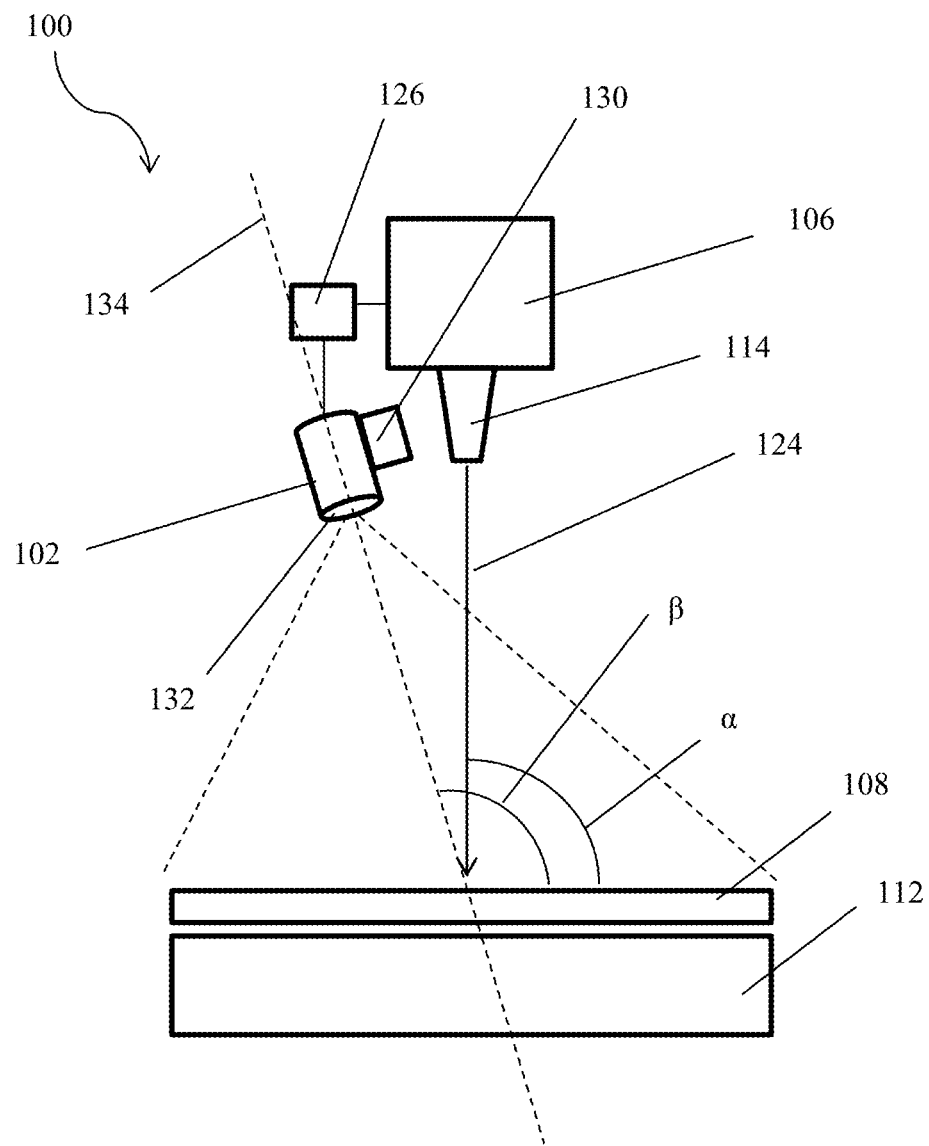
FIG. 1 is an exemplary architecture that can be used with an embodiment of a system.
Figure 2:
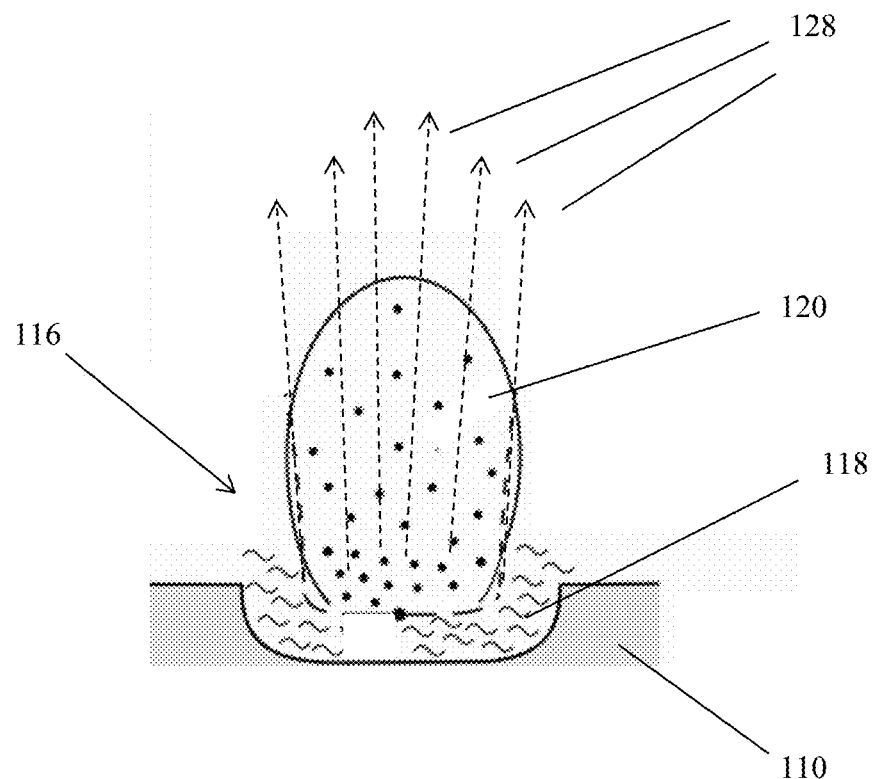
FIG. 2 is an exemplary laser interaction zone that may be generated using an embodiment of the system.
Figure 3:
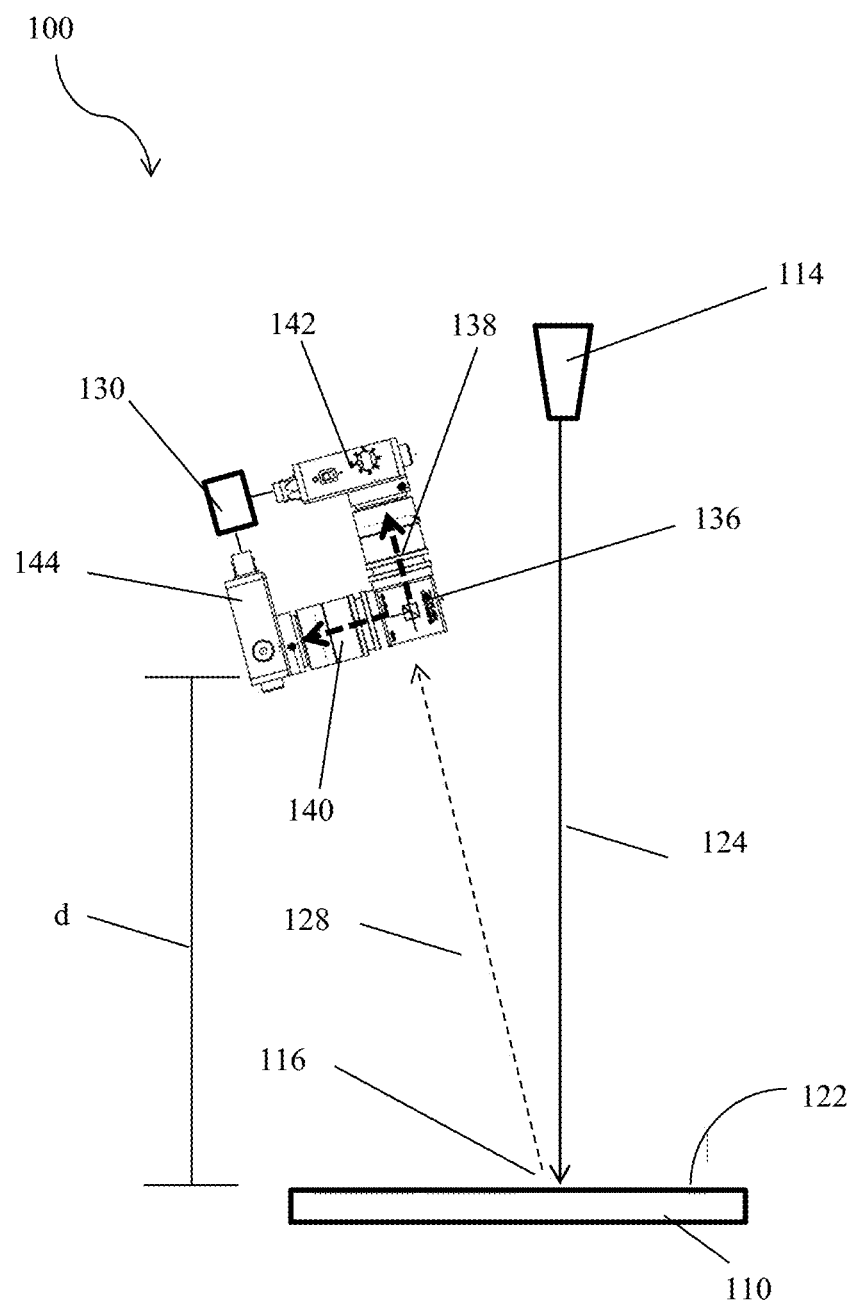
FIG. 3 is another exemplary architecture that can be used with an embodiment of the system.
Figure 4:
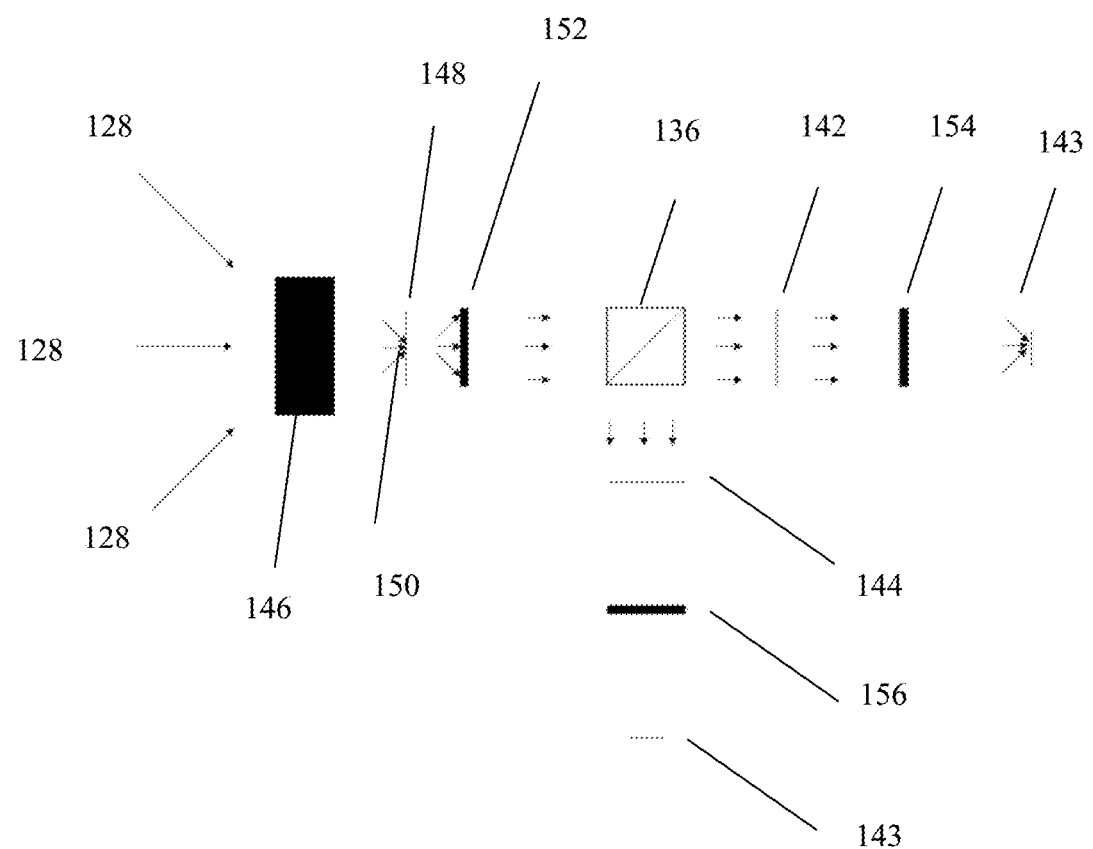
FIG. 4 is an exemplary architecture of an embodiment of a multi-spectral sensor.

Referring to FIGS. 1 and 2, embodiments of the system 100 can include to a multi-spectral sensor 102 that can be configured to collect electromagnetic emissions from a surface 122 of a substrate. The substrate can be a part 104 being generated during the build process via additive manufacturing. For example, the multi-spectral sensor 102 can be configured to collect spectra data from a surface 122 (including a melt pool 118 and plume 120) of a part 104 as the part 104 is being fabricated via an additive manufacturing process. While embodiments of the system 100 and methods related thereto are described and illustrated for used during additive manufacturing of a part 104, and in particular Powder Bed Fusion Additive Manufacturing (PBFAM) of a part 104, it is should be understood that the system 100 can be used in any situation where a melt pool 118 and a plume 120 can be analyzed. These can include other forms of additive manufacturing (e.g., directed energy deposition additive manufacturing), arc welding, laser welding, optical emission spectroscopy, laser cladding, laser nitriding, etc.

An embodiment of the system 100 can include an additive manufacturing apparatus (AMA) 106. The AMA 106 can be a machine configured to generate a part 104 by adding build material 110 or components in a layer 108 by layer 108 fashion. In some embodiments, each layer 108 may be formed from a powder material or other layer 108 material being added to a portion of the part 104, or a substrate, as the part 104 is being fabricated.

For instance, the process of generating a part 104 in such a manner can be referred to as the build process or the build. The build can involve depositing a layer 108 of build material 110 (a layer of build material may be referred to as a bed) on a build plate 112. The build material 110 can be in powder form. An energy source 114 can be used to generate a plume or plasma of the build material 110. Upon cooling, the build material 110 fuses together to form an integral piece of the part 104. Another layer 108 of build material 110 can be deposited and the process can be continued. In some embodiments, the build plate 112 can be moved downward to after each layer 108 is deposited during the build. The type of build material 110, the layer 108 thickness, the movement of the energy source 114, the movement of the build plate 112, etc. can be controlled via a processor that has been programmed to execute operations in accordance with an additive manufacturing file. The additive manufacturing file can be program logic that has build material 110 specifications (e.g., material and chemical characteristics) and operating parameters (e.g., energy source 114 power, energy source 114 movement, build plate 112 movement, a three-dimensional profile scan of the part, etc.) specific for the build of the part 104 stored in non-transitory memory that defines a method that the processor utilizes as the processor controls the performance of the additive manufacturing process. The processor can be a central processing unit (CPU), a controller, one or more microprocessors, a core processor, an array of processors, a control circuit, or other type of hardware processor device.

An example of the AMA 106 can be a ProX 200 Machine. The AMA 106 can have a laser 114 as the energy source. The laser 114 can be used to impart a laser beam 124 on the layer 108 to generate a laser interaction zone 116. The laser interaction zone 116 can be the portion of the layer 108 where the plasma is being formed. The laser interaction zone 116 can include a melt pool 118 and a plume 120. The melt pool 118 can be a liquid formation of the build material 110. The plume 120 can be a plasma and/or vapor formation of the build material 110 and may include components of the surrounding atmosphere. The plume 120 can be formed adjacent the melt pool 118. For example, the melt pool 118 can be a liquid build material 110 region at or near the surface 122 of the build material 110 where the laser beam 124 makes contact with the build material 110. The plume 120 can be an elongated mobile column of plasma or vapor of build material 110 extending upward from the melt pool 118.

An embodiment of the AMA 106 can include a monitoring unit 126. The monitoring unit 126 can include processors, sensors, and other circuitry configured to record data and analyze data related to the operational parameters of the AMA 106. The operational parameters can include laser 114 triggering (e.g., the laser 114 turning on and off), laser 114 power, laser 114 position, laser 114 movement, build plate 112 movement, build layer 108 number, feed rate of the build material 110, etc. The monitoring unit 126 can be configured to provide high-speed (e.g., 100 kHz), real-time measurements to generate the operational parameter data.

An embodiment of the system 100 can include a multi-spectral sensor 102. In some embodiments, the multi-spectral sensor 102 can configured to be communicatively associated with the AMA 106 or be a part of the AMA 106. This can include being communicatively associated with the monitoring unit 126. Some embodiments can include synchronizing the multi-spectral sensor 102 with the monitoring unit 126. This can facilitate configuring the multi-spectral sensor 102 to operate at a rate set by the monitoring unit 126 (e.g., 100 kHz.). An embodiment of the multi-spectral sensor 102 can be configured to receive electromagnetic emission light 128 from the surface 122 of the build material 110. This can include receiving electromagnetic emission light 128 from the laser interaction zone 116. For example, the electromagnetic emission light 128 can be light that is generated due to material interactions of the build material 110 via the laser beam 124.

In one embodiment, the multi-spectral sensor 102 can be configured to detect material interactions via received electromagnetic emission light 128 by spectral analysis. For example, the multi-spectral sensor 102 can include an optical receiver 132 configured to direct the electromagnetic emission light 128 to photo sensors 143 that can convert the light into spectral data. In some embodiment, the multi-spectral sensor 102 can include an optical emission spectrometer 130 configured to analyze the detected light via spectral analysis. The multi-spectral sensor 102 can be configured to be communicatively associated with the optical emission spectrometer 130 or the optical emission spectrometer 130 can be part of the multi-spectral sensor 102. An example of the optical emission spectrometer 130 can be a low-speed (e.g., 5 Hz spectrometer).

The laser 114 can be configured so that the laser beam 124 being emitted there-from is incident upon the surface 122 of the building material layer 108 at an angle $\alpha$. $\alpha$ can be defined as an angle of the laser beam 124 relative to a geometric plane of the surface 122 of the building material layer 108. $\alpha$ can be within a range from 45 degrees to 135 degrees. For example, optical elements (e.g., lenses, prisms, mirrors, reflectors, refractors, collimators, beam splitters, etc.) and actuators (e.g., microelectromechanical system (MEMS), gimbal assemblies, etc.) of the laser 114 can be used to direct the laser beam 124 in a predetermined direction so that it is incident upon the building material layer 108 at $\alpha$. Any of the actuators can be actuated to cause $\alpha$ to be constant or to vary. The multi-spectral sensor 102 can be configured to receive electromagnetic emission light 128 from the surface 122 at an angle $\beta$. $\beta$ can be defined as an angle of the optical receiver's axis 134 of the multi-spectral sensor 102 relative to the geometric plane that is the surface 122 of the building material layer 108. $\beta$ can be within a range from 45 degrees to 135 degrees. Optical elements and actuators of the multi-spectral sensor 102 can be used to cause the multi-spectral sensor 102 to be positioned at $\beta$. Any of the actuators can be actuated to cause $\beta$ to be constant or to vary.

$\alpha$ can be the same as or different from $\beta$. It is contemplated for $\beta$ to be different from $\alpha$ so as to keep the multi-spectral sensor 102 out of the laser beam's optical path. For example, $\alpha$ can be 90 degrees and $\beta$ can be 105 degrees. Keeping $\beta$ different from $\alpha$ may be referred to herein as generating an off-axis multi-spectral sensor 102 arrangement. Embodiments of the system 100 can be configured to set the multi-spectral sensor 102 off-axis with respect to the laser 114 so as to allow the multi-spectral sensor 102 to collect spectral data simultaneously as the laser 114 is used to build the part 104. As will be explained later, the system 100 can be configured to generate a ratio measurement of the electromagnetic emission light 128. The ratio can be used as part of the spectral analysis. Using the ratio can facilitate collection of spectral data in a manner that is insensitive to or independent from the multi-spectral sensor's 102 location and orientation relative to the surface 122 of the build material 110 (i.e., using the ratio can allow for collection of spectral data in the off-axis multi-spectral sensor 102 arrangement).

Referring to FIGS. 3-6, an embodiment of the multi-spectral sensor 102 can be configured to collect spectral data related to continuum emissions and/or line-to-continuum emissions. In spectral analysis, continuum emissions pertain to a continuum of emissions from the atoms/molecules of the material. Line emissions pertain to absorptions/emissions of the interactions the atoms/molecules have with the electromagnetic radiation used for the spectral analysis. Line-to-continuum emissions is a compilation of the line emissions with the continuum emissions (e.g., a superposition of the line emissions on a background of continuum emissions). Embodiments of the system 100 can be configured to use a ratio of these emissions for spectral analysis.

The multi-spectral sensor 102 can be configured so that electromagnetic emission light 128 from the laser interaction zone 116 can be split. This can involve causing the electromagnetic emission light 128 to pass through a beam splitter 136. The beam splitter 136 can be located at the optical receiver 132 of the multi-spectral sensor 102. The multi-spectral sensor 102 can be configured so that electromagnetic emission light 128 from the surface 122 can be incident upon the optical receiver 132 and pass through the beam splitter 136. The beam splitter 136 can be configured to generate two light beams. The first light beam 138 can be light representative of the line emissions of the build material 110. The second light beam 140 can be light representative of the continuum emissions of the build material 110. Selection of line and continuum emission regions is material dependent. For example, the multi-spectral sensor 102 can be configured for materials containing chromium, such as stainless steels and nickel super alloys. This can involve configuring the beam splitter 136 to generate a first light beam 138 at or near 520 nm (corresponding to a line emission region around 520 nm) and generate a second light beam 140 at or near 530 nm (corresponding to a continuum emission region around 530 nm). In some embodiments, the beam splitter 136 can be configured to generate a plurality of first light beams 138, each first light beam 138 being representative of a separate line emissions of the build material 110. The beam splitter 136 can also be configured to generate a plurality of second light beams 140, each second light beam 140 being representative of a separate continuum emission of the build material 110. For example, for build materials 110 containing titanium, a plurality of first light beams 138, each one corresponding to a line emission region around 330 nm, 365 nm, 399 nm, 500 nm, 520 nm, or 550 nm, respectively, can be generated. In addition, a plurality of second light beams 140, each one corresponding to a continuum region around 415 nm, 420 nm, 435 nm, 480 nm, 530 nm, 540 nm, 570 nm, or 650 mm, respectively, can be generated. It may be beneficial for a continuum region to be selected as close as possible to a line region. For example, a 430 nm continuum region with a 10 nm full width at halve maximum may be selected for a line region around 420 nm with a 10 nm full width at halve maximum such that the regions are neighboring.

Embodiments of the beam splitter 136 can be configured to split the electromagnetic emission light 128 into the first light beam 138 and the second light beam 140 at a desired ratio. For example, the beam splitter 136 can be a 50:50 beam splitter. Other beam splitting ratios can be used.

Some embodiments can include a plurality of beam splitters 136. For example, the multi-spectral sensor 102 can include a first beam splitter 136, a second beam splitter 136, a third beam splitter 136, etc. As a non-limiting example, the first beam splitter 136 can be configured to split the electromagnetic emission light 128 into a first light beam 138 and a second light beam 140 at a 20:80 ratio, the second beam splitter 136 can be configured to split the electromagnetic emission light 128 into a first light beam 138 and a second light beam 140 at a 50:50 ratio, the third beam splitter 136 can be configured to split the electromagnetic emission light 128 into a first light beam 138 and a second light beam 140 at a 60:40 ratio. The first, second, and third beam splitters 136 can be placed in a serial arrangement. This can be done to allow the system 100 to measure and/or record first and second light beams 138, 140 at multiple ratios simultaneously. More or less beam splitters 136 can be used.

Embodiments of the multi-spectral sensor 102 can include a first filter 142 and a second filter 144. The multi-spectral sensor 102 can be configured so that the first light beam 138 is caused to pass through the first filter 142 and the second light beam 140 is caused to pass through the second filter 144. Embodiments of the first filter 142 can be configured to pass electromagnetic emission light 128 that is expected to correspond to the line emissions of the build material 110, which can include line emissions of any one or combination of components of the build material 110 and/or any environmental contaminates within the build material 110. Embodiments of the second filter 144 can be configured to pass electromagnetic emission light 128 that is expected to correspond to the continuum emissions of the build material 110, which can include continuum emissions of any one or combination of components of the build material 110 and/or any environmental contaminates within the build material 110. Any one or combination of the first filter 142 and the second filter 144 can be a bandpass filter.

As noted herein, a build can involve formation of the part 104 by melting or fusing build material 110 deposited in layers 108. While it is contemplated for each layer 108 to include the same build material 110, one layer 108 can be of a first type of build material 110 and another layer 108 can be a second type of build material 110. An embodiment of the beam splitter 136, the first filter 142, and the second filter 144 can be configured to pass electromagnetic emission light 128 that is expected to correspond to the line emissions of the build material 110 of a particular layer 108. This can be achieved by using a tunable beam splitter 136, a tunable first filter 142, and a tunable second filter 144.

Any one or combination of the first filter 142 and the second filter 144 can be in connection with or include a photo sensor 143, camera, spectrometer, etc. configured to facilitate generating an electrical voltage and/or current as a function of the amplitude of the light passing through the filter 142, 144. For example, the first filter 142 and/or the second filter 144 can be an avalanche photodiode configured to pass electromagnetic radiation within a predetermined range of wavelengths and reject and/or attenuate electromagnetic radiation outside the range. The predetermined range can be set using a full width halve maximum (FWHM) measure. The photodiode portion of the filter 142, 144 can generate an electrical voltage and/or current that is a function of the amplitude of the light being passed through the filter 142, 144. The electrical voltage and/or current can be converted into a signal and used for spectral analysis.

It is contemplated for the multi-spectral sensor 102 to be able to scan for light being emitted from an entire surface 122 of the build material 110. For example, the multi-spectral sensor 102 can be configured to collect and process electromagnetic emission light 128 from the entire surface 122 of the build material 110. Thus, an embodiment of the system 100 can be configured to maintain a predetermined distance between the multi-spectral sensor 102 and surface 122 of the build material 110 so as to allow for scanning the entire surface 122. For example, the surface 122 of the build material 110 can be 275×275 mm². With this non-limiting example, the multi-spectral sensor 102 can be positioned at a distance d=480 nm from the surface of the build material 110 as the multi-spectral sensor 102 is at an angle β of 105 degrees. As noted herein, the build plate 112 can be moved downward after each layer 108 is deposed, which can allow for maintaining the d=480 nm distance. d being set to 480 mm is for the exemplary arrangement described above. It will be appreciated by one skilled in the art for d to be set at a distance that can allow the optical receiver 132 to capture all the electromagnetic emissions from the entire surface 122 of the build material 110.

In at least one embodiment, the multi-spectral sensor 102 can be configured to reduce wavelength shifts associated with light propagation at angle not normal to the surface of each filter 142, 144 or surface of each photo sensor 143 of each filter. For example, the surface 122 of the build material 110 may be too large to accommodate a predetermined distance d (e.g., the surface 122 may be greater than 275 mm×275 mm²), or it may be desirable to reduce the distance d as much as possible. The optics within the multi-spectral sensor 102 can be configured to cause a maximum amount of electromagnetic emission light 128 entering the multi-spectral sensor 102 to be at an angle normal (or approximately normal) to the surface of each filter 142, 144 or photo sensor 143 of each filter. For example, the multi-spectral sensor 102 can include an optical receiver lens 146. The optical receiver lens 146 can be configured to receive the electromagnetic emission light 128 and focus it at an image plane 148. The multi-spectral sensor 102 can include a corrector 150. The corrector 150 can be located at the image plane 148 and be configured to diffuse the angle of incidence of the electromagnetic emission light 128 to increase the field of view of emission light 128 which can propagate to the collimating lens 152 and reduce dependence of the angle of incidence of light 128. The multi-spectral sensor 102 can include a collimating lens 152. The collimating lens 152 can be positioned at a distance approximately equal to its focal length from the image plane 148. The collimating lens 152 can be configured to collimate the electromagnetic emission light 128 onto the beam splitter 136. The first light beam 138 can exit the beam splitter 136 and be directed to pass through the first filter 142. The light exiting the first filter 142 can pass through a first filter lens 154 before being incident upon the photo sensor 143 of the first filter 142. The second light beam 140 can exit the beam splitter 136 and be directed to pass through the second filter 144. The light exiting the second filter 144 can pass through a second filter lens 156 before being incident upon the photo sensor 143 of the second filter 144.

Collimating the electromagnetic emission light 128 before entering the beam splitter 136 can cause a maximum amount of electromagnetic emission light 128 entering the multi-spectral sensor 102 to be at an angle normal (or approximately normal) to the surface of each filter 142, 144 or photo sensor 143 of each filter. This can reduce wavelength shifts associated with light propagation at angle not normal to the surface of each filter 142, 144 or photo sensor 143.

The multi-spectral sensor 102 can be configured to transmit the first light beam 138 and the second light beam 140 to the optical emission spectrometer 130. Embodiments of the optical emission spectrometer 130 can have a processor configured to generate a continuum to line-to-continuum ratio based on the first light beam 138 and the second light beam 140. For example, the processor can be configured to generate line data $S_{Line}$ representative of the intensity of the first light beam 138 and generate continuum data $S_{Continuum}$ representative of the intensity of the second light beam 140. The processor can be configured to subtract $S_{Continuum}$ from $S_{Line}$ to generate line-continuum difference data ($S_{Line}-S_{Continuum}$). The processor can be configured to divide ($S_{Line}-S_{Continuum}$) by the $S_{Continuum}$ to generate continuum to line-to-continuum ratio data $S_{Line-to-Continuum}$.

As noted herein, embodiments of the multi-spectral sensor 102 can be synchronized with the monitoring unit 126. This can be done to facilitate generating $S_{Line}$, $S_{Continuum}$, ($S_{Line}-S_{Continuum}$), and/or $S_{Line-to-Continuum}$ data that includes layer 108 number information, layer 108 thickness information, etc. As noted herein, embodiments of the monitoring unit 126 can be configured to operate at 100 kHz, and thus $S_{Line}$, $S_{Continuum}$, ($S_{Line}-S_{Continuum}$), and/or $S_{Line-to-Continuum}$ data can be generated at a rate of 100,000 times per second. Some embodiments of the monitoring unit 126 can allow a user to identify user-specified regions that are defined by volumes of space within the part 104. A user-specified region can span a portion of a layer 108, an entire layer 108, or multiple layers 108. This can facilitate generating $S_{Line}$, $S_{Continuum}$, ($S_{Line}-S_{Continuum}$), and/or $S_{Line-to-Continuum}$ that includes at least one user-specified region. Similarly, the system 100 can be configured to provide $S_{Line}$, $S_{Continuum}$, ($S_{Line}-S_{Continuum}$), and/or $S_{Line-to-Continuum}$ for a portion of a layer 108, a particular layer 108, multiple layers 108, a user-specified region, multiple user specified regions, etc. In one embodiment, a user can define a region of interest 158 (see FIG. 11). The region of interest 158 can be a compilation of $S_{Line}$, $S_{Continuum}$, ($S_{Line}-S_{Continuum}$), and/or $S_{Line-to-Continuum}$ data for a portion of the part 104. The portion of the part 104 can include any one or combination of layers 108 and user specified regions.

Figure 5:
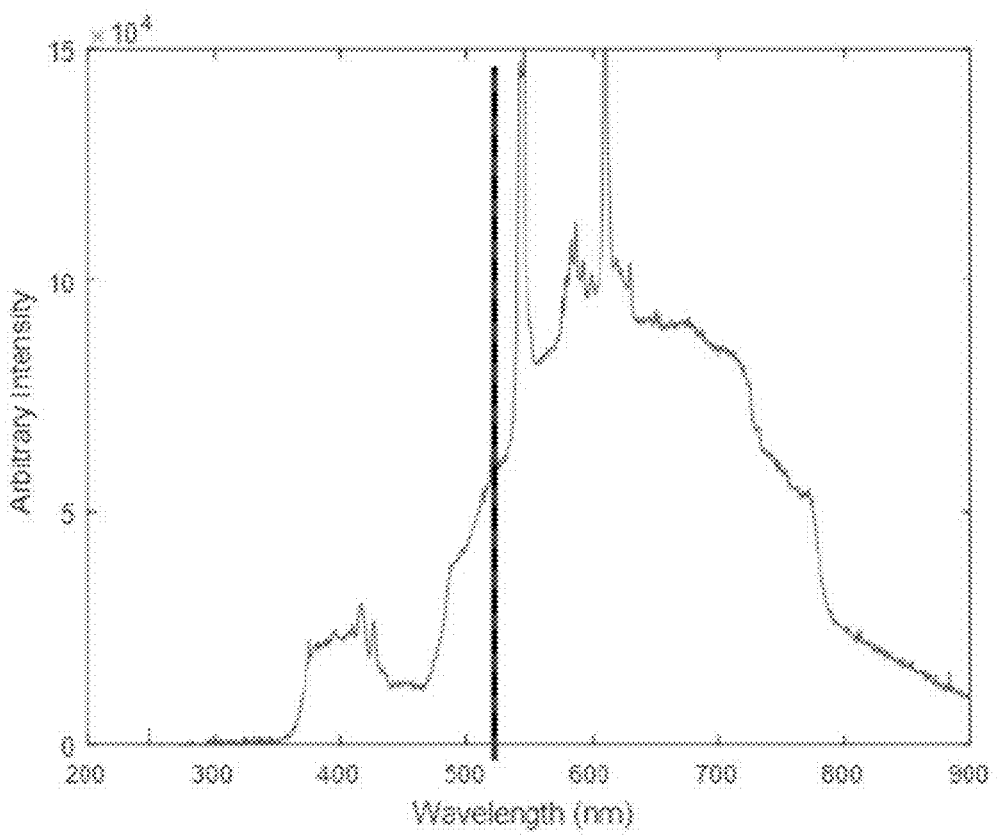
FIG. 5 is an exemplary spectrum that can be generated during a build process.
Figure 6:
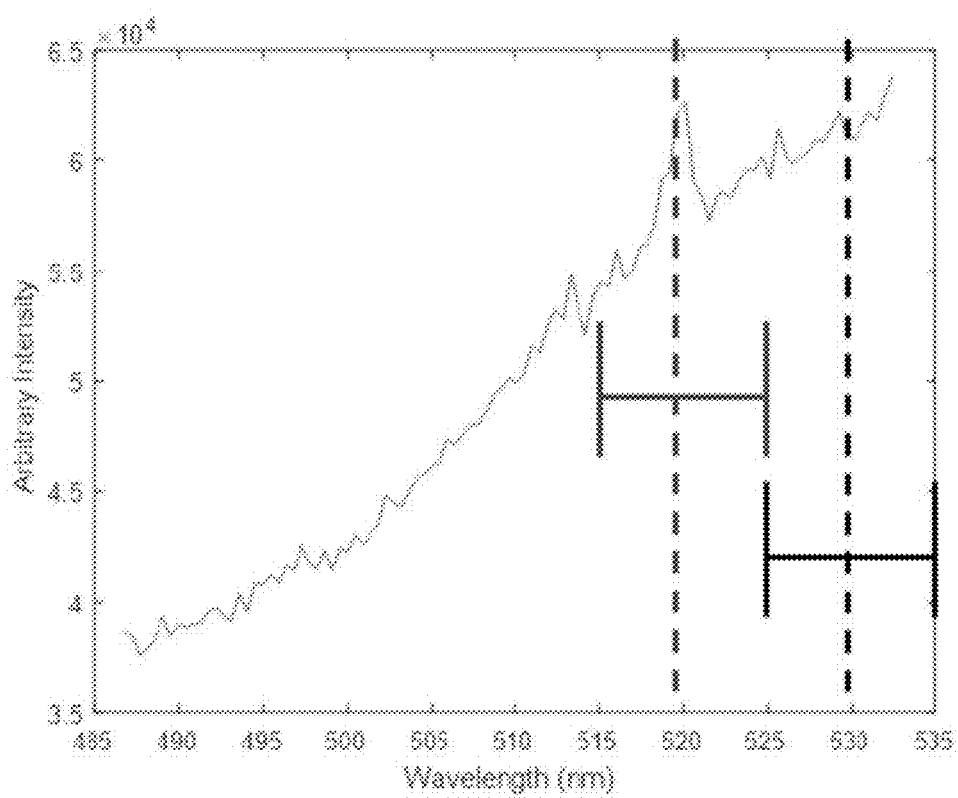
FIG. 6 is another exemplary spectrum that can be generated during a build process.

As a non-limiting, exemplary embodiment, the first filter 142 can be a bandpass filter configured to pass electromagnetic emission light 128 at or near 520 nm with a FWHM of 10 nm. This can correspond to line-to-continuum of Chromium (Cr I) emission lines around 520 nm. The second filter 144 can be a bandpass filter configured to pass electromagnetic emission light 128 at or near 530 nm with a FWHM of 10 nm. This can correspond to estimated continuum emissions of Chromium. As shown in FIGS. 5-6, while at least one line emission is observed around 520 nm, only continuum emissions are observed around 530 nm. Use of a line-to-continuum emissions to continuum emissions ratio can reduce or eliminate dependence of the collection of spectral data on the location and orientation of the multi-spectral sensor 102 relative to the surface 122. For example, although the absolute magnitude for line-to-continuum emissions and the absolute magnitude for the continuum emissions may vary with respect to location and orientation, the line-to-continuum emissions to continuum emissions ratio does not.

For example, assuming each of $S_{Line}$ and $S_{Continuum}$ is a function of position x and y along the build plate 112 or the surface 122 of the build material 110, then they can be function of position f(x,y). Assuming each of $S_{Line}$ and $S_{Continuum}$ is a function of plume 120 temperature T, plume 120 density n, and plume 120 volume V, then they can be function of g(T,n,V). Assuming each of $S_{Line}$ and $S_{Continuum}$ is also a function of background signal $S_{Background}$. Then:

$$S_{Line} = f_{line}(x,y)g_{line}(T,n,V) + S_{background}, S_{Continuum} = f_{cont}(x,y)g_{cont}(T,n,V) + S_{background}$$

Therefore, $$S_{Line-to-Continuum} = (S_{Line} - S_{Continuum})/S_{Continuum} = [f_{line}(x,y)g_{line}(T,n,V) + S_{background}] - [f_{cont}(x,y)g_{cont}(T,n,V) + S_{background}]/[f_{cont}(x,y)g_{cont}(T,n,V) + S_{background}]$$

This can be simplified to:

$$S_{Line-to-Continuum} = [(g_{line}(T,n,V)) - (g_{cont}(T,n,V))]/g_{cont}(T,n,V)$$

If $S_{background}$ is assumed to be small or non-varying in time and position, then $S_{Line-to-Continuum}$ is entirely dependent on plume parameters. Thus, $S_{Line-to-Continuum}$ is not dependent on distance d and/or angle β.

Embodiments of the system 100 in which the multi-spectral sensor 102 is in an off-axis arrangement can reduce or eliminate distortions observed when sensing on-axis with respect to the laser beam 124. This can be particularly beneficial if an f-theta of wavelength-specific optics (designed for directing or focusing the laser beam 124 wavelength) are used to direct and/or focus the laser beam 124. Alternatively, using the $S_{Line-to-Continuum}$ ratio with an embodiment of the multi-spectral sensor 102 in an on-axis arrangement with respect to the laser beam 124 can reduce distortions associated with wavelength-specific optics, such as an f-theta lens, by distorting both $S_{Line}$ and $S_{Continuum}$ by a similar degree. For example, an f-theta lens can distort light at wavelength other than the wavelength of the laser beam 124. This can cause the absolute intensity of electromagnetic emission light 128 to vary with position. But the line-to-continuum measurement should not, as long as line wavelength and continuum wavelength are close. Thus, measurement of $S_{Line-to-Continuum}$ is less affected by distortions due to on-axis optics that the absolute magnitude for the line or continuum emissions. Preferably line and continuum regions are selected which are close to one another to reduce distortions. The optical emission spectrometer 130 can be configured to perform analysis with the continuum to $S_{Line-to-Continuum}$. This can include performing statistical analysis, generating graphical representations, etc. that are representative of anomalies or defects (e.g., voids) in the part 104. For example, a void formed in the part 104 during the build can appear as specific emission signatures represented by voltage outputs of the photo sensors 143. The emission signature of a void region may be identified by a calculated variation from the expected emission signature of a non-void region (e.g. variation of the mean, median, maximum, minimum, etc.). Voids may also be detected via a machine learning algorithm (e.g. support vector machine, neural network, etc.).

Figure 7:
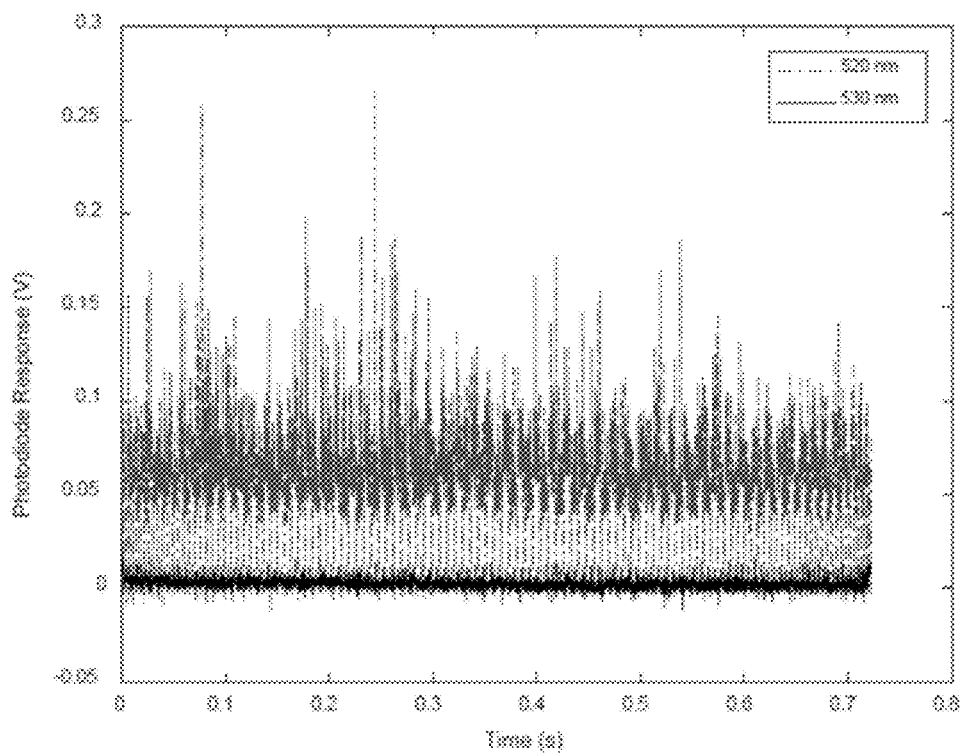
FIG. 7 is an exemplary graphical representation of an output from an embodiment of the multi-spectral sensor.

FIG. 7 shows an output that can be generated from an embodiment of the multi-spectral sensor 102, wherein the first filter 142 is a bandpass filter configured to pass electromagnetic emission light 128 at or near 520 nm with a FWHM of 10 nm and the second filter 144 is a bandpass filter configured to pass electromagnetic emission light 128 at or near 530 nm with a FWHM of 10 nm. The optical emission spectrometer 130 can be configured to determine the probability of flaw formation based on statistical or machine learning approaches of the output data obtained from the multi-spectral sensor 102. For example, the output data can be used to identify points greater than three standard deviations from the mean. Alternatively, a machine learning approach can be used wherein location-specific $S_{Line-to-Continuum}$, $S_{Line}$, $(S_{Line}-S_{Continuum})$, and/or $S_{Continuum}$ can be set as input features and one or more measurements of location-specific build quality (e.g. location-specific-density from computed tomography or metallography data) can be used as the ground truth for training.

As noted herein, embodiments of the multi-spectral sensor 102 can be in communication with the monitoring unit 126. In some embodiments, the monitoring unit 126 can be used to monitor and control operating parameters of the AMA 106. Synchronizing the multi-spectral sensor 102 with the monitoring unit 126 can facilitate generating a feedback loop. For example, real-time spectral data can be collected and analyzed to identify anomalies in the part 104 as the part 104 is being built. The information about anomalies can be processed by the monitoring unit 126 to make adjustments to the operating parameters and accommodate or correct for the anomalies. In some instances this can include aborting the build.

Some embodiments can involve using the information about anomalies to guide post-build inspection techniques. For example, the system 100 can be used to identify anomalies within a region of interest 158. Knowing the region of interest 158, post-build inspection techniques (e.g., X-ray computer tomography (CT)) can be limited to the region of interest 158 instead of analyzing the entire part 104.

An exemplary method for implementing the system 100 can involve depositing a first layer 108 of build material 110 on a build plate 112. The method can involve using a laser 114 to generate a laser beam 124 so that the laser beam 124 is at an angle α with respect to a surface 122 of the first layer 108. The method can involve using a multi-spectral sensor 102 with an optical receiver axis 134 at an angle β with respect to the surface 122 of the first layer 108, wherein α is not equal to β. The multi-spectral sensor 102 can be configured to receive electromagnetic emission light 128 from at least a laser interaction zone 116 of the surface 122 of the first layer 108. In some embodiments, the multi-spectral sensor 102 can be configured to receive electromagnetic emission light 128 from the entire top surface 122 of the first layer 108, which can involve positioning the multi-spectral sensor at a distance d from the surface 122 of the first layer 108.

The method can involve using the multi-spectral sensor 102 to generate a first light beam 138 corresponding to line emissions of at least one component of the build material 110 and to generate a second light beam 140 corresponding to continuum emissions of at least one component of the build material 110. This can involve generating the first light beam 138 and he second light beam 140 via a beam splitter 136. The method can involve: generating line data $S_{Line}$ representative of an intensity of the first light beam; generating continuum data $S_{Continuum}$ representative of an intensity of the second light beam; subtracting $S_{Continuum}$ from $S_{Line}$ to generate line-continuum difference data $(S_{Line}-S_{Continuum})$; and dividing $(S_{Line}-S_{Continuum})$ by the $S_{Continuum}$ to generate continuum to line-to-continuum ratio data $S_{Line-to-Continuum}$. The method can involve generating $S_{Line-to-Continuum}$ as the first layer 108 is being deposited, while the laser beam 124 generates the laser interaction zone 116 on the first layer 108, and/or while the build material 110 forms a plasma and consolidates into the part 102.

The method can involve lowering the build plate 112 and depositing a second layer 108 of build material 110 on the first layer 108. The method can involve using a laser 114 to generate a laser beam 124 so that the laser beam 124 is at an angle α with respect to a surface 122 of the second layer 108. The method can involve using a multi-spectral sensor 102 with an optical receiver axis 134 at an angle β with respect to the surface 122 of the second layer 108, wherein α is not equal to β. The multi-spectral sensor 102 can be configured to receive electromagnetic emission light 128 from at least a laser interaction zone 116 of the surface 122 of the second layer 108. In some embodiments, the multi-spectral sensor 102 can be configured to receive electromagnetic emission light 128 from the entire top surface 122 of the second layer 108. For example, the method can involve positioning the multi-spectral sensor at a distance d from the surface 122 of the second layer 108 so that the optical receiver 132 can receive electromagnetic emissions from the entire surface 122 of the second layer 108.

The method can involve using the multi-spectral sensor 102 to generate a first light beam 138 corresponding to line emissions of at least one component of the build material 110 and to generate a second light beam 140 corresponding to continuum emissions of at least one component of the build material 110. The method can involve: generating line data $S_{Line}$ representative of an intensity of the first light beam; generating continuum data $S_{Continuum}$ representative of an intensity of the second light beam; subtracting $S_{Continuum}$ from $S_{Line}$ to generate line-continuum difference data $(S_{Line}-S_{Continuum})$; and dividing $(S_{Line}-S_{Continuum})$ by the $S_{Continuum}$ to generate continuum to line-to-continuum ratio data $S_{Line-to-Continuum}$. The method can involve generating $S_{Line-to-Continuum}$ as the second layer 108 is being deposited, while the laser beam 124 generates the laser interaction zone 116, and/or while the build material 110 forms a plasma and consolidates into the part 102.

The method can involve lowering the build plate 112 and depositing a third layer 108 of build material 110 on the second layer 108. The method can involve using a laser 114 to generate a laser beam 124 so that the laser beam 124 is at an angle α with respect to a surface 122 of the third layer 108. The method can involve using a multi-spectral sensor 102 with an optical receiver axis 134 at an angle β with respect to the surface 122 of the third layer 108, wherein α is not equal to β. The multi-spectral sensor 102 can be configured to receive electromagnetic emission light 128 from at least a laser interaction zone 116 of the surface 122 of the third layer 108. In some embodiments, the multi-spectral sensor 102 can be configured to receive electromagnetic emission light 128 from the entire top surface 122 of the third layer 108. For example, the method can involve positioning the multi-spectral sensor at a distance d from the surface 122 of the third layer 108 so that the optical receiver 132 can receive electromagnetic emissions from the entire surface 122 of the third layer 108.

The method can involve using the multi-spectral sensor 102 to generate a first light beam 138 corresponding to line emissions of at least one component of the build material 110 and to generate a second light beam 140 corresponding to continuum emissions of at least one component of the build material 110. The method can involve: generating line data $S_{Line}$ representative of an intensity of the first light beam; generating continuum data $S_{Continuum}$ representative of an intensity of the second light beam; subtracting $S_{Continuum}$ from $S_{Line}$ to generate line-continuum difference data $(S_{Line}-S_{Continuum})$; and dividing $(S_{Line}-S_{Continuum})$ by the $S_{Continuum}$ to generate continuum to line-to-continuum ratio data $S_{Line-to-Continuum}$. The method can involve generating $S_{Line-to-Continuum}$ as the third layer 108 is being deposited, while the laser beam 124 generates the laser interaction zone 116, and/or while the build material 110 forms a plasma and consolidates into the part 102.

The method can involve iterating the process for a fourth layer 108, a fifth layer 108, etc.

The method can involve generating $S_{Line-to-Continuum}$ that is insensitive or independent of the distance d and the angle β. In some embodiments, angle β can be set such that the multi-spectral sensor 102 if out of the laser beams optical path.

Some embodiments can involve generating a feedback loop so that $S_{Line}$, $S_{Continuum}$, $(S_{Line}-S_{Continuum})$, and/or $S_{Line-to-Continuum}$ data can be used to identify anomalies (e.g., generate anomaly information) related to defects in the part 104 in real-time as the part 104 is being built.

Some embodiments can involve using anomaly information to automatically control operating parameters of the AMA 106 to accommodate or correct for the anomalies. For example, anomaly information can be used by the monitoring unit 126 to automatically control operational parameters of the AMA 106 that accommodate or correct for the anomalies.

Some embodiments can involve using anomaly information to guide post-build inspection techniques. An example of a post-build inspection technique is X-ray CT imaging. Embodiments of the system 100 can generate anomaly information for at least one region of interest 158. The anomaly information and the region of interest 158 can be used by a X-ray CT imaging apparatus or a user of the X-ray CT imaging apparatus to limit the inspection to region of interest 158 and to use focused techniques to search for the type of defect associated with the anomaly.

Testing

Figure 8:
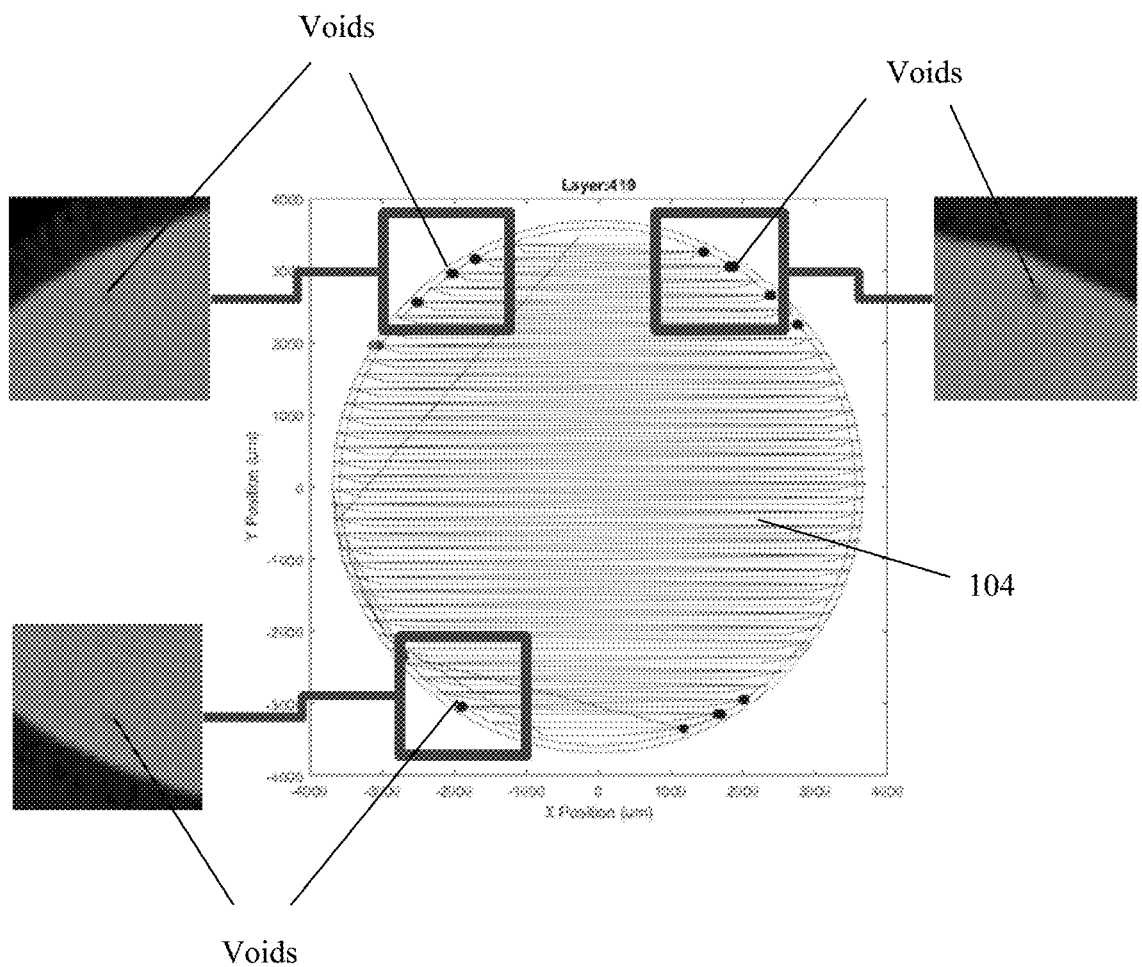
FIG. 8 is an exemplary data analysis representation of anomalies detected via an embodiment of the system in comparison to anomalies detected using computed tomography.

Tests were conducted on disk samples using an embodiment of the system 100 and the results were compared to results of X-ray CT images to validate the effectiveness of the system 100. For example, an embodiment of the system 100 was used to identify voids in parts 104 formed as disks and this information was compared to post-build CT imaging used to identify the voids in the parts 104. The parts 104 were formed as disks using nickel alloy Inoncel 625 as the build material 110 in a PBFAM build process. FIG. 8 shows the identified voids in layer number 419 using an embodiment of the system 100 during the build and voids identified using CT imagery post-build. FIG. 8 illustrates that anomalies (e.g., voids) detected by an embodiment of the system 100 match locations of anomalies detected post-process using CT imagery. Anomalies (e.g., voids) were detected by an embodiment of the system 100 by identifying line-to-continuum ratio data $S_{Line-to-Continuum}$ with values greater than three standard deviations from the mean.

For the validation testing, an open protocol monitoring unit 126 was interfaced with a 3D Systems ProX 200 AMA 106. The multi-spectral sensor 102 was synchronized with scanner position and the state of the laser 114 during buildup of components under varying powers, scan speeds, and hatch spacing parameters. Multi-spectral sensor 102 measurements were then compared to post-build CT cans. The results indicate that multi-spectral sensor 102 data, when combined with appropriate analyses, are related to both processing conditions and build quality. Histograms of the line-to-continuum ratio data $S_{Line-to-Continuum}$ showed variations relative to processing conditions used for buildup of the components.

Figure 9:
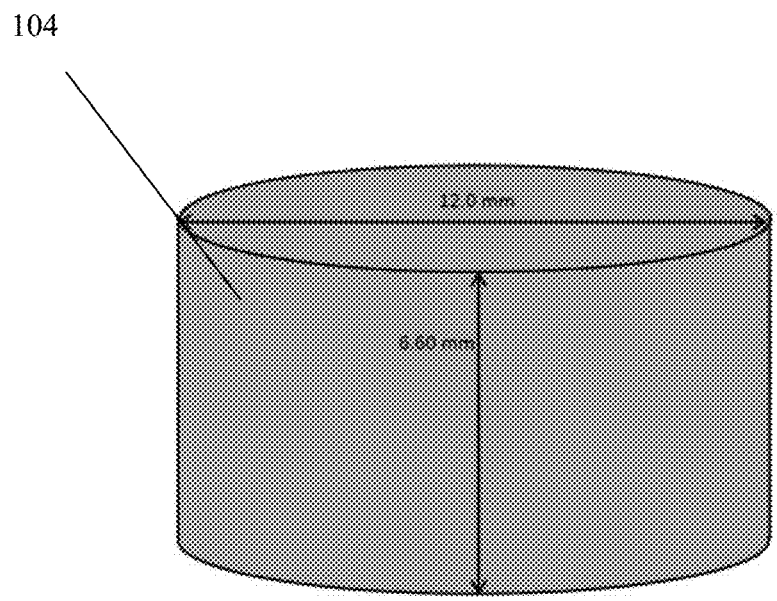
FIG. 9 is an exemplary disk geometry of a part that was built to test the validity of an embodiment of the system.

Referring to FIG. 9, cylindrical disks, all with identical geometries, were built on the 3D Systems ProX 200 AMA 106. Each disk was 6.6 mm tall with a diameter of 12 mm. Inconel 718 powder, supplied by 3D Systems, was sieved through a 65 μm mesh. The parts 104 were all built with a specified layer thickness of 30 μm. Four disks, referred to as disk A, disk B, disk C, and disk D were built using different powers, scan speeds and hatch spacing, as illustrated in Table 1.

TABLE 1

| Disk specifications | | | |
|---|---|---|---|
| Disk | Power (Watts) | Scan Speed (mm/s) | Hatch Spacing (μm) |
| A | 300 | 2500 | 25 |
| B | 264 | 1875 | 25 |
| C | 264 | 1875 | 100 |
| D | 300 | 2500 | 50 |

Figure 10:
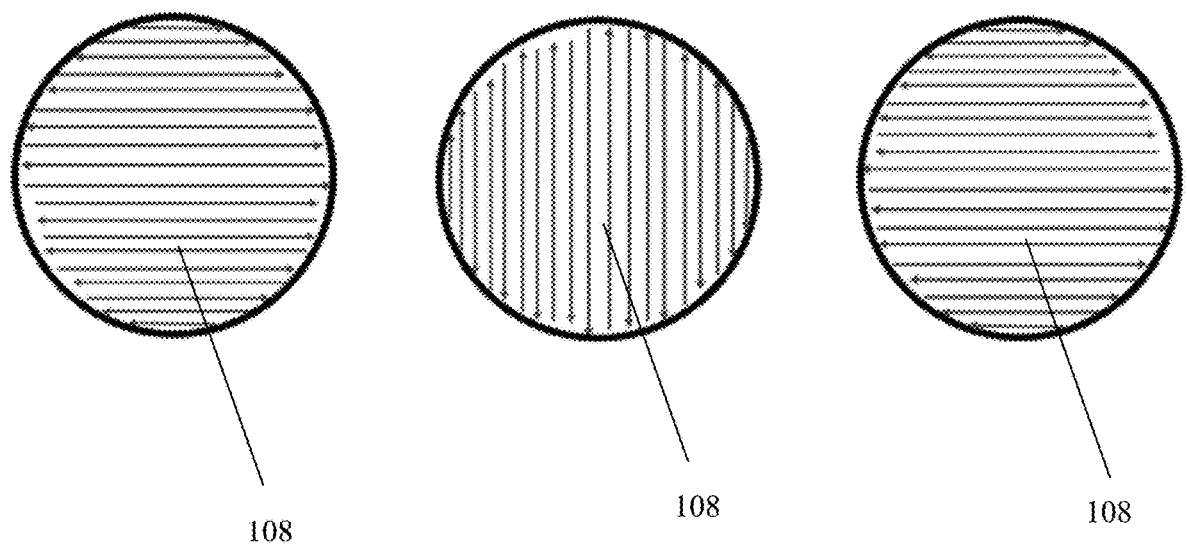
FIG. 10 shows an exemplary schematic of a back and forth hatch pattern with 90° rotation used to build disks using an embodiment of the system.

Disk D was built using default ProX 200 processing parameters for Inconel 718, which was expected to result in a nearly defect-free component. The remaining disks were built with non-ideal processing conditions to intentionally induce defects. All disks were built using the back-and-forth hatching strategy shown in FIG. 10. Hatches were rotated 90° on each layer 108.

Sample outputs of the 520 nm-filtered (line) photodiode and 530 nm-filtered (continuum) photodiodes from disk D, for a single layer, are shown in FIG. 7. As expected, 520 nm emissions, which include line emissions, fluctuate and remain more intense than 530 nm (continuum) emissions. Also as expected, for such a small geometry there is not much fluctuation in the continuum signal. As a result of position and relative angle to the multi-spectral sensor 102, both signals can be expected to vary with location, across the build plate 112 or the surface 122 of the build material layer 108. However, $S_{Line-to-Continuum}$ can be used to reduce or eliminate the dependence on location and orientation.

Figure 11:
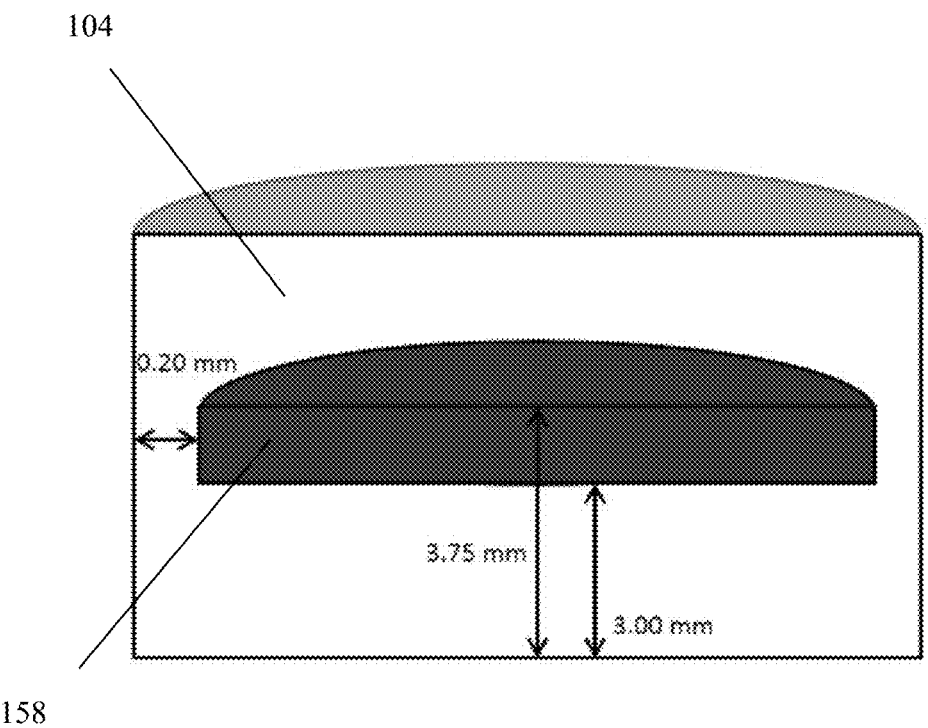
FIG. 11 shows an exemplary disk geometry with an identified region of interest.

Following part 104 build-up and data collection, multi-spectral sensor 102 data captured during the experiment were compared with post-built X-Ray CT analysis to provide a measurement of build quality. For the experiment, build quality was defined as the percentage of voids occurring within a region of interest 158 near the center of each disk. It should be noted that significant lack-of-fusion (and a resulting crack) between layers 108 was observed over a region of some builds due to a build stoppage, but the region of the disks encompassing this discontinuity were not included in the analysis. Also, analysis of the CT data excluded surface defects located less than 200 μm from the outer surface of the disks. The region of interest 158 for both the multi-spectral data and CT data ranged across 25 layers (750 μm of build height) on each disk between a build height of 3.0 mm and 3.75 mm, as seen in FIG. 11.

CT measurements were used to determine the quality of each disk. CT volumes were produced with a voxel size of 15 μm. The CT volumes were sliced with a spacing of 15 μm between images. The image plane was parallel with the build plane so that multi-spectral regions could easily be compared the CT data. Within the CT analysis, the described region of interest 158 was located using the top surface of the part 104 to ignore dimensional error from post-build removal of the disks.

A threshold based analysis was used to identify defects within the region of interest 158. It should be noted that the non-uniform background illumination present radially through the disk, as a result of beam hardening, was corrected for. A background approximation was calculated using a scan at the middle of the region of interest 158 and applied to all layers 108. A new background correction was calculated for each disk as slight discrepancies in orientation can affect the non-uniform background illumination. All disks were binarized using the same threshold value. Once the threshold was applied, voids were identified and sorted by size. Void sizes were determined by number of void voxels that were connected within a layer 108. Voids smaller than 16875 µm³ (5 voxels) were ignored.

Figure 12:
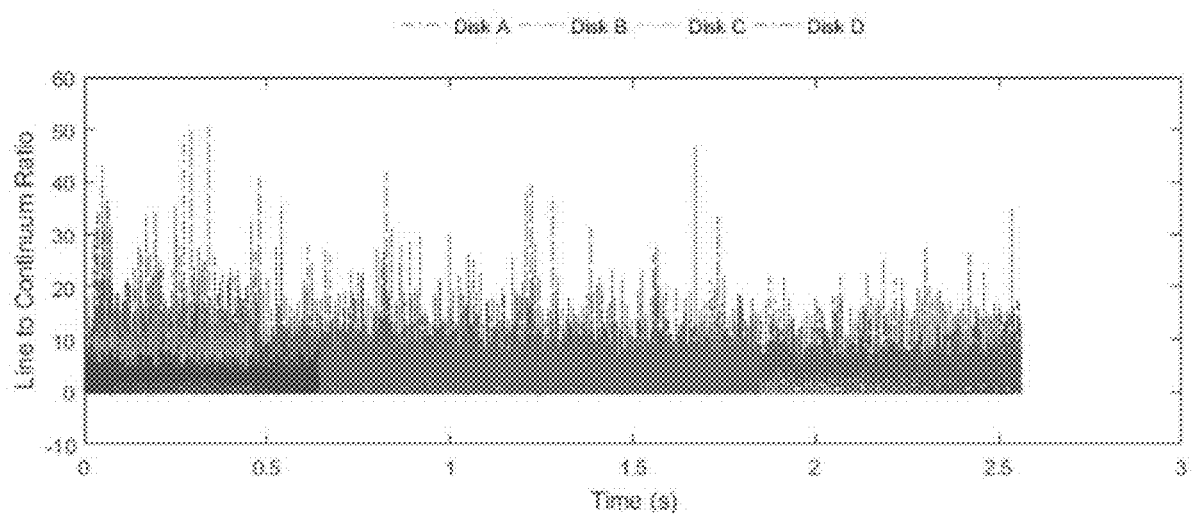
FIG. 12 shows $S_{Line-to-Continuum}$ signal data that was generated for a disk A, a disk B, a disk C, and a disk D.
Figure 13:
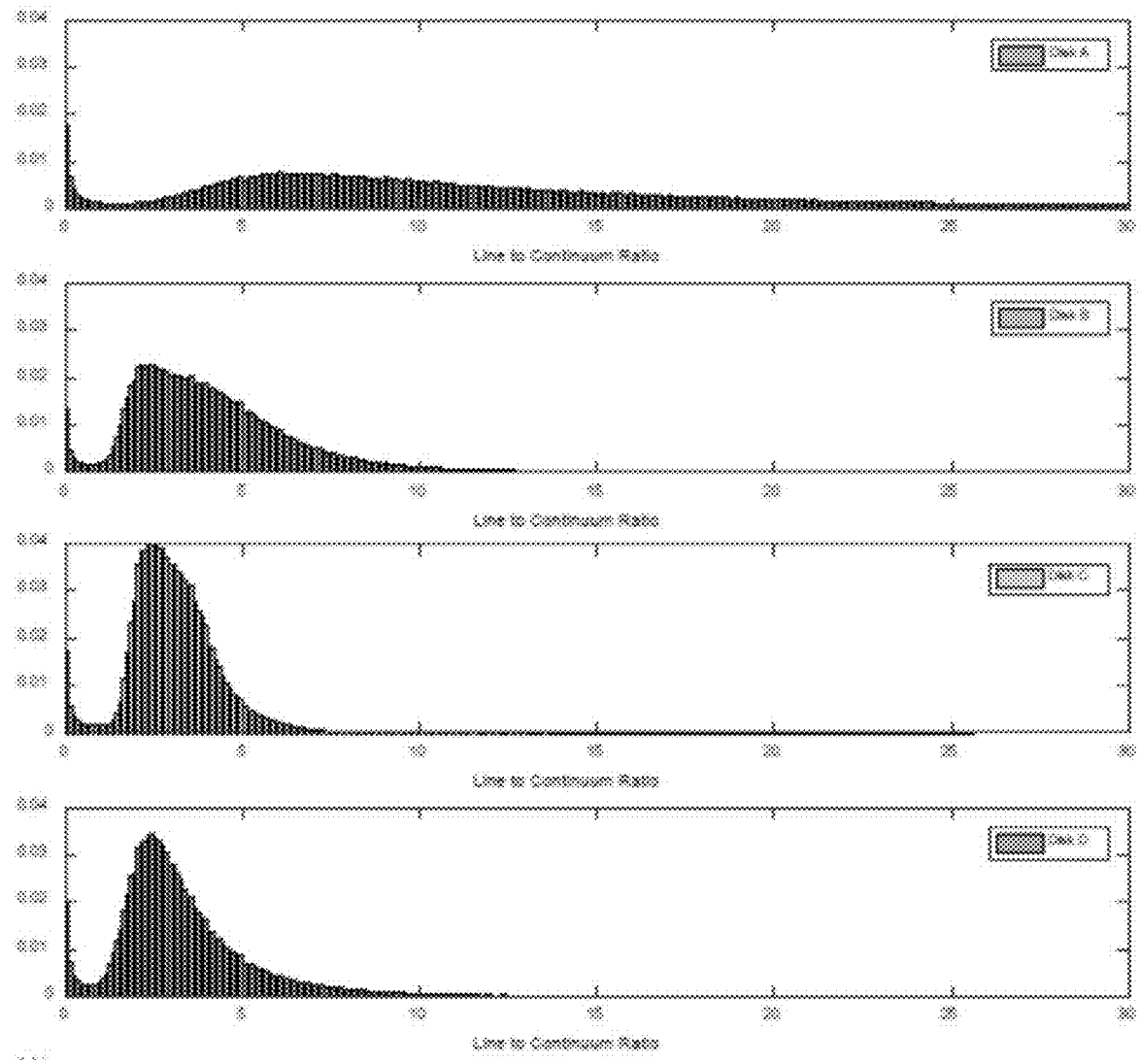
FIG. 13 are normalized histograms of the spectral responses for disk A, disk B, disk C, and disk D for 25 layers of material.

FIG. 12 shows $S_{Line-to-Continuum}$ signal data for each of disk A, disk B, disk C, and disk D. A comparison of $S_{Line-to-Continuum}$ signal data, with respect to time was difficult due to varying processing speed and hatch spacing for each disk. However, converting the fluctuating data for each disk into histograms across regions of interest 158 made inter-disk comparison easier and provided useful insights. Normalized histograms of the accumulated line-to-continuum response across the region of interests 158 for disk A, disk B, disk C and disk D are shown in FIG. 13. Each disk has a distinct distribution of the line-to-continuum histogram. This was expected given the differences in their build parameters. Of particular note, the distributions for disk A had a much higher magnitude line-to-continuum response and disk C had a much lower line-to-continuum response than either disk B or disk D.

Figure 14:
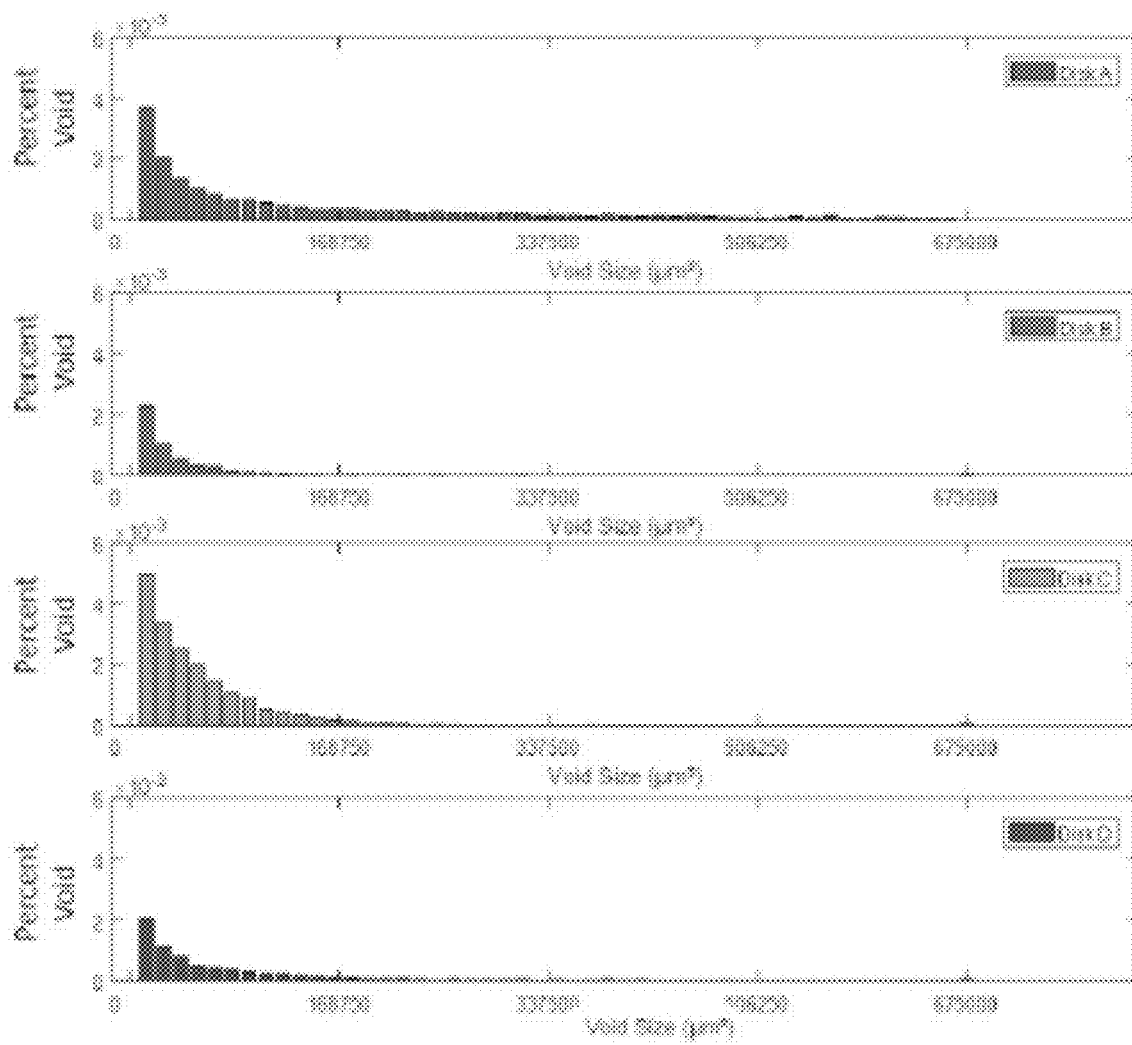
FIG. 14 shows percent voids within each disk by void size across 25 layers (750 μm) of built material for disk A, disk B, disk C, and disk D.
Figure 15:
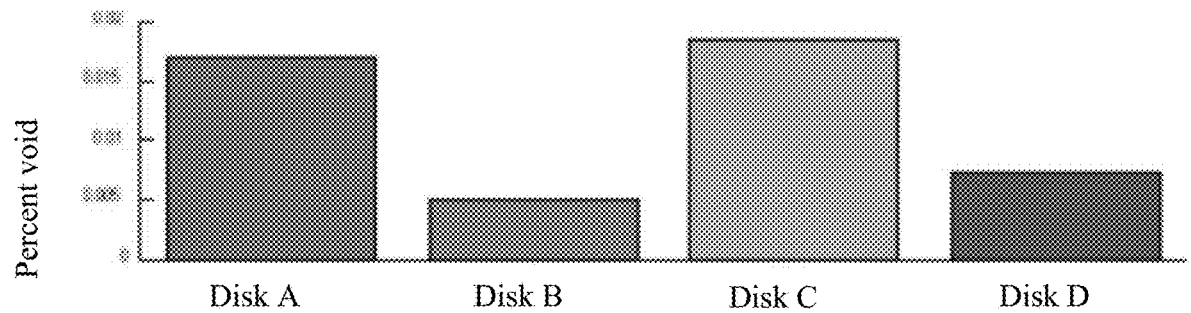
FIG. 15 shows accumulated percent void across 25 layers (750 μm) of built material for disk A, disk B, disk C, and disk D.

CT analysis was used to assess part 104 quality through a threshold analysis to determine percent void within each of the disks. Voids detected were shown separated by void size (see FIG. 14), as well as total percent void within the region of interest 158 (see FIG. 15). Review of FIGS. 14 and 15 shows that the different processing parameters used in each of these disks resulted in disparate build qualities. Disk C had the highest percent void and was comprised of many small voids throughout the disk. Whereas, disk A had less voids that were much larger in size. Disks B and D had similar percent voids, with only a few small voids in either disk. Both the line-to-continuum response and the percent void for disk B and disk D were similar, each having an average line-to-continuum response and a low percent void as compared with the other disks. Disk A, which had the highest magnitude line-to-continuum response, also had a higher percentage void than either disk B or disk D. Disk C, which had the lowest line-to-continuum response, also resulted in a high percent void. Disk C had the lowest energy input per layer 108 which resulted, in this case, with consistent porosity throughout the region of interest 158 and the lowest magnitude line-to-continuum response, which may be indicative of a lack of fusion during processing.

Embodiments of the system 100 can be configured to utilize a plurality of multi-spectral sensors 102. This can be done to facilitate collection of spectral data from a plurality of energy sources 114. For instance, the system 100 can include a first multi-spectral sensor 102, a second multi-spectral sensor 102, a third multi-spectral sensor 102, etc. The system 100 can further include a first energy source 114, a second energy source 114, a third energy source 114, etc. With the system configuration having a plurality of multi-spectral sensors 102 and energy sources 114, the system 100 can be configured to simultaneously collect spectral data of a substrate that is build material of a part 104. As noted herein, the part 104 can be build material being made via additive manufacturing (e.g., each energy source 114 may be a laser beam used for sintering or fusion of the built material into the part 104).

Embodiments of the system 100 can be configured to set each multi-spectral sensor 102 at a unique location, and be arranged such that the field of view of one multi-spectral sensor 102 overlaps one or more other fields of view of another multi-spectral sensor 102. This can allow each multi-spectral sensor 102 to collect spectral data simultaneously as multiple lasers are used to build the part 104. For instance, the first multi-spectral sensor 102 can be located at a coordinate $x_1, y_1, z_1$, the second multi-spectral sensor 102 can be located at a coordinate $x_2, y_2, z_2$, the third multi-spectral sensor 102 can be located at a coordinate $x_3, y_3, z_3$, wherein $(x_1, y_1, z_1)$ does not equal $(x_2, y_2, z_2)$ or $(x_3, y_3, z_3)$, $(x_2, y_2, z_2)$ does not equal $(x_1, y_1, z_1)$ or $(x_3, y_3, z_3)$, and $(x_3, y_3, z_3)$ does not equal $(x_2, y_2, z_2)$ or $(x_1, y_1, z_1)$ but that the field of view of the first multi-spectral sensor 102 overlaps the field of view of the second and/or third multi-spectral sensor 102, the field of view of the second multi-spectral sensor 102 overlaps the field of view of the first and/or third multi-spectral sensor 102, and/or the field of view of the third multi-spectral sensor 102 overlaps the field of view of the second and/or first multi-spectral sensor 102.

It should be noted that the system 100 can be configured to set each energy source 114 to impart energy on a unique location on the part 104. For instance, the first energy source 114 can be configured to impart energy on the part 104 at $x_a$, $y_a$, the second energy source 114 can be configured to impart energy on the part 104 at $x_b$, $y_b$, and the third energy source 114 can be configured to impart energy on the part 104 at $x_c$, $y_c$, wherein $(x_a, y_a)$ does not equal $(x_b, y_b)$ or $(x_c, y_c)$, $(x_b, y_b)$ does not equal $(x_a, y_a)$ or $(x_c, y_c)$, and/or $(x_c, y_c)$ does not equal $(x_b, y_b)$ or $(x_a, y_a)$.

With the system arrangement of a plurality of multi-spectral sensors 102 and energy sources 114, the first energy source 114 can generate first spectral data (emanating from the $x_a$, $y_a$ location), the second energy source 114 can generate second spectral data (emanating from the $x_b$, $y_b$ location), and the third energy source 114 can generate third spectral data (emanating from the $x_c$, $y_c$ location). While the $x_a$, $y_a$ location is in the first multi-spectral sensor 102 field of view, the $x_b$, $y_b$ location is in the second multi-spectral sensor 102 field of view, and the $x_c$, $y_c$ location is in the third multi-spectral sensor 102 field of view, any one or combination of the $(x_a, y_a)$, $(x_b, y_b)$, and $(x_c, y_c)$ locations can be in the fields of view of any one or combination of multi-spectral sensors 102 due to the field of view overlap arrangement.

As noted herein, embodiments of the system 100 can be configured to facilitate determining build quality of the part 104 in real time by assessing the spectral emittance during the build process. With a system arrangement of a plurality of multi-spectral sensors 102 and energy sources 114, a calibration technique may be used. The calibration of the spectral emittance (e.g., identifying and differentiating the first spectral data, the second spectral data, and the third spectral data) can be used to perform deconvolution of the collected spectral data so as to determine the contribution of each energy source 114 to the measured spectral emittance. FIG. 16 shows an exemplary calibration procedure to perform calibration on one or more multi-spectral sensors 102. A calibration correction and correction for positional dependence can be determined for each multi-spectral sensor 102. The calibration can be used to determine the positional dependence of an individual energy source 114 of the measured signal. For example, the first energy source 114 located at a position $(x_a, y_a)$ will produce a spectral intensity (S) measured by the first multi-spectral sensor 102 so as to generate a signal of $S=G(x_1,y_1)$, the second energy source 114 located at a position $(x_b, y_b)$ will produce a spectral intensity (S) measured by the second multi-spectral sensor 102 so as to generate a signal of $S=G(x_2,y_2)$, the third energy source 114 located at a position $(x_c, y_c)$ will produce a spectral intensity (S) measured by the third multi-spectral sensor 102 so as to generate a signal of $S=G(x_2,y_2)$. Due to the field of view overlap, any one or combination of multi-spectral sensors 102 can measure and generate $S=G(x_1,y_1)$, $S=G(x_2,y_2)$, or $S=G(x_3,y_3)$. As will be explained below, positional dependence of the multi-spectral sensors 102 and/or energy sources 114 can be used to identify and differentiate the spectra data. For instance, an individual energy source. $G(x_n, y_n)$ can be determined using a calibration procedure that involves translating a light source at positions (x,y) of the build material and by simultaneously measuring the response of each multi-spectral sensor 102. It should be noted that the beam width of the energy source 114 should be less than the spacing between neighboring (x,y) locations used for calibration. Possible sources include a tungsten filament lamp, a light-emitting diode, a laser source, etc. Positions used for calibration should cover the possible substrate area and be on the order of 25 mm or less in spacing.

Figure 17:
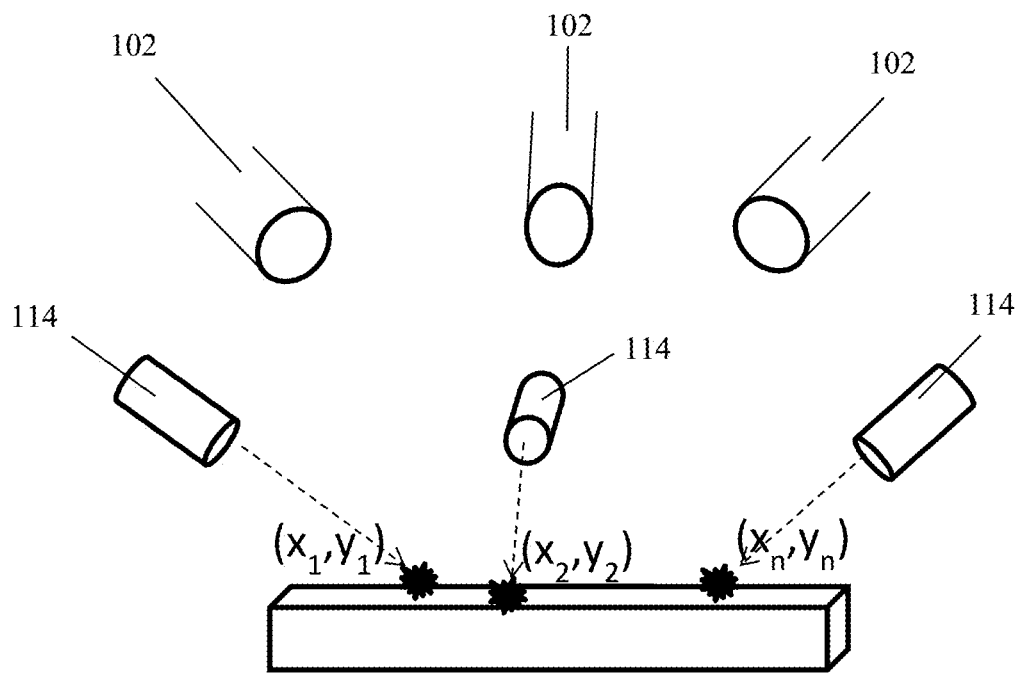
FIG. 17 shows an exemplary architecture including multiple sources used to generate spectra that can be simultaneously captured by multiple multi-spectral sensors.

FIG. 17 shows an exemplary architecture including multiple sources used to generate spectra that can be simultaneously captured by multiple multi-spectral sensors 102. n multi-spectral sensors 102 can monitor a process wherein n energy sources 114 are present. Given knowledge of the location of each energy source 114 and the effect of position on the measured spectral intensity by each multi-spectral sensor 102, the contribution of each energy source 114 to the measured intensity of each multi-spectral sensor 102 can be determined by solving for n equations with n unknowns. For example, each multi-spectral sensor 102 on the $n^{th}$ detector system 100 measures signals $S_n = G(x_1,y_1) \text{Source}_1 + G(x_1,y_1) \text{Source}_2 + \ldots + \text{Source}_n$.

It should be understood that modifications to the embodiments disclosed herein can be made to meet a particular set of design criteria. For instance, the number of or configuration of multi-spectral sensors 102, filters 142, 144, lasers 114, monitoring units 126, AMAs 106, and/or other components or parameters may be used to meet a particular objective. In addition, any of the embodiments of the system 100 disclosed herein can be connected to other embodiments of the system 100 to generate a desired system 100 configuration.

It will be apparent to those skilled in the art that numerous modifications and variations of the described examples and embodiments are possible in light of the above teachings of the disclosure. For instance, a number of different powder materials can be used for fabrication of a part 104. The powder composition(s) that is selected can be selected to meet a particular set of design criteria. As another example, the type of part being fabricated can be any of a number of suitable parts 104 to meet a particular design objective. The disclosed examples and embodiments are presented for purposes of illustration only. Other alternative embodiments may include some or all of the features of the various embodiments disclosed herein. For instance, it is contemplated that a particular feature described, either individually or as part of an embodiment, can be combined with other individually described features, or parts of other embodiments. The elements and acts of the various embodiments described herein can therefore be combined to provide further embodiments.

Therefore, it is the intent to cover all such modifications and alternative embodiments as may come within the true scope of this invention, which is to be given the full breadth thereof. Additionally, the disclosure of a range of values is a disclosure of every numerical value within that range, including the end points. Thus, while certain exemplary embodiments of apparatuses and methods of making and using the same have been discussed and illustrated herein, it is to be distinctly understood that the invention is not limited thereto but may be otherwise variously embodied and practiced within the scope of the following claims.

It should also be appreciated that some components, features, and/or configurations may be described in connection with only one particular embodiment, but these same components, features, and/or configurations can be applied or used with many other embodiments and should be considered applicable to the other embodiments, unless stated otherwise or unless such a component, feature, and/or configuration is technically impossible to use with the other embodiment. Thus, the components, features, and/or configurations of the various embodiments can be combined together in any manner and such combinations are expressly contemplated and disclosed by this statement. Thus, while certain exemplary embodiments of the system 100 have been shown and described above, it is to be distinctly understood that the invention is not limited thereto but may be otherwise variously embodied and practiced within the scope of the following claims.

What is claimed is:

1. A multi-spectral sensor, comprising:
a receiver configured to receive electromagnetic emissions from a surface of a substrate;
a splitter configured to split the electromagnetic emissions into a first light beam and a second light beam, the first light beam corresponding to line emissions of at least one component of the substrate, the second light beam corresponding to continuum emissions of the at least one component of the substrate;
a first filter configured to receive the first light beam and pass light having wavelengths within a 10 nm range about the line emissions of the at least one component of the substrate and block or attenuate light having wavelengths outside the 10 nm range about the line emissions of the at least one component of the substrate;
a second filter configured to receive the second light beam and pass light having wavelengths within a 10 nm range about the continuum emissions of the at least one component of the substrate and block or attenuate light having wavelengths outside the 10 nm range about the continuum emissions of the at least one component of the substrate;
a processor configured to:
generate line data $S_{Line}$ representative of an intensity of the first light beam;
generate continuum data $S_{Continuum}$ representative of an intensity of the second light beam;
subtract $S_{Continuum}$ from $S_{Line}$ to generate line-continuum difference data ($S_{Line} - S_{Continuum}$); and
divide ($S_{Line} - S_{Continuum}$) by the $S_{Continuum}$ to generate continuum to line-to-continuum ratio data $S_{Line-to-Continuum}$.

2. The multi-spectral sensor recited in claim 1, wherein:
the receiver is an optical receiver having an optical receiver axis;
the optical axis forms an angle β with respect to the surface of the substrate;
the optical receiver is a distance d from the surface of the substrate; and
$S_{Line-to-Continuum}$ is independent of d and/or β.

3. The multi-spectral sensor recited in claim 1, further comprising:
an optical receiver lens configured to receive the electromagnetic emissions and focus the electromagnetic emissions at an image plane;
a corrector located at the image plane and configured to diffuse an angle of incidence of the electromagnetic emissions; and
a collimating lens positioned at a distance approximately equal to its focal length from the image plane and configured to collimate electromagnetic emissions onto the splitter; and
wherein the splitter is a beam splitter.

4. The multi-spectral sensor recited in claim 1, wherein the processor is an optical emission spectrometer.

5. The multi-spectral sensor recited in claim 1, wherein electromagnetic emissions comprises emissions related to a melt pool and a plume generated on the surface.

6. The multi-spectral sensor recited in claim 1, wherein the at least one component of the substrate comprises build material of the substrate and a contaminate.

7. The additive manufacturing apparatus recited in claim 1, wherein the processor is an optical emission spectrometer.

8. The additive manufacturing apparatus recited in claim 1, further comprising a monitoring unit configured to synchronize with the multi-spectral sensor.

9. The additive manufacturing apparatus recited in claim 8, wherein the synchronization comprises generating a compilation of $S_{Line}$, $S_{Continuum}$, $(S_{Line}-S_{Continuum})$, and/or $S_{Line-to-Continuum}$ data for at least one layer of the part.

10. The additive manufacturing apparatus recited in claim 8, wherein:
the monitoring unit is configured to monitor and control operating parameters of the additive manufacturing apparatus;
the synchronization comprises generating a feedback loop so that $S_{Line}$, $S_{Continuum}$, $(S_{Line}-S_{Continuum})$, and/or $S_{Line-to-Continuum}$ data is used to identify anomalies related to defects in the part in real-time as the part is being built; and
anomaly information is used to automatically control operating parameters of the additive manufacturing apparatus to accommodate or correct for the anomalies.

11. The multi-spectral sensor recited in claim 1, wherein the multi-spectral sensor further comprises:
an optical receiver lens configured to receive the electromagnetic emissions and focus the electromagnetic emissions at an image plane;
a corrector located at the image plane and be configured to diffuse an angle of incidence of the electromagnetic emissions; and
a collimating lens positioned at a distance approximately equal to its focal length from the image plane and configured to collimate electromagnetic emissions onto the beam splitter.

12. The multi-spectral sensor recited in claim 1, wherein the substrate comprises build material of a part made by an additive manufacturing apparatus.

13. The multi-spectral sensor recited in claim 12, wherein the processor is configured to generate $S_{Line}$, $S_{Continuum}$, $(S_{Line}-S_{Continuum})$, and/or $S_{Line-to-Continuum}$ data in situ as the part is being generated.

14. An additive manufacturing apparatus, comprising:
an energy source configured to melt, sinter, or fuse build material to form a part by imparting energy on a surface of build material, wherein imparting energy on the surface generates a melt pool and a plume on the surface;
a multi-spectral sensor, comprising:
an optical receiver configured to receive electromagnetic emissions from at least the melt pool and the plume;
a beam splitter configured to split the electromagnetic emissions into a first light beam and a second light beam, the first light beam corresponding to line emissions of at least one component of the build material, the second light beam corresponding to continuum emissions of the at least one component of the build material;
a first filter configured to receive the first light beam and pass light having wavelengths within a 10 nm range about the line emissions of the at least one component of the build material and block or attenuate light having wavelengths outside the 10 nm range about the line emissions of the at least one component of the build material;
a second filter configured to receive the second light beam and pass light having wavelengths within a 10 nm range about the continuum emissions of the at least one component of the build material and block or attenuate light having wavelengths outside the 10 nm range about the continuum emissions of the at least one component of the build material;
a processor configured to:
generate line data $S_{Line}$ representative of an intensity of the first light beam;
generate continuum data $S_{Continuum}$ representative of an intensity of the second light beam;
subtract $S_{Continuum}$ from $S_{Line}$ to generate line-continuum difference data $(S_{Line}-S_{Continuum})$; and
divide $(S_{Line}-S_{Continuum})$ by the $S_{Continuum}$ to generate continuum to line-to-continuum ratio data $S_{Line-to-continuum}$.

15. The additive manufacturing apparatus recited in claim 14, wherein the energy source is a laser.

16. The additive manufacturing apparatus recited in claim 15, wherein:
the laser is configured to generate a laser beam at an angle α relative to the surface of the build material;
the optical receiver has an optical receiver axis and the optical axis forms an angle β with respect to the surface of the build material; and
α does not equal β.

* * * * *